US012658184B2

(12) United States Patent
Ture et al.

(10) Patent No.: US 12,658,184 B2
(45) Date of Patent: Jun. 16, 2026

(54) VISUALIZATION INTERFACE FOR VOICE INPUT

(71) Applicant: COMCAST CABLE COMMUNICATIONS, LLC, Philadelphia, PA (US)

(72) Inventors: Ferhan Ture, Washington, DC (US); Md Iftekhar Tanveer, Rochester, NY (US)

(73) Assignee: Comcast Cable Communication LLC, Philadelphia, PA (US)

( * ) Notice: Subject to any disclaimer, the term of this patent is extended or adjusted under 35 U.S.C. 154(b) by 104 days.

(21) Appl. No.: 16/041,405

(22) Filed: Jul. 20, 2018

(65) Prior Publication Data

US 2020/0027446 A1     Jan. 23, 2020

(51) Int. Cl.
| | |
|---|---|
| *G10L 15/22* | (2006.01) |
| *G06F 16/31* | (2019.01) |
| *G06F 16/358* | (2025.01) |
| *G10L 15/16* | (2006.01) |
| *G10L 15/18* | (2013.01) |

(52) U.S. Cl.
CPC ........ *G10L 15/1822* (2013.01); *G06F 16/322* (2019.01); *G06F 16/358* (2019.01); *G10L 15/16* (2013.01)

(58) Field of Classification Search
CPC ...... G06F 40/00; G06F 40/205; G06F 40/237; G06F 40/30; G06F 40/35; G10L 15/22
See application file for complete search history.

(56) References Cited

U.S. PATENT DOCUMENTS

| | | | |
|---|---|---|---|
| 5,832,428 A | 11/1998 | Chow et al. | |
| 8,694,488 B1 * | 4/2014 | Garg ................... | G06F 16/3322 |
| | | | 707/721 |
| 2004/0111253 A1 | 6/2004 | Luo et al. | |
| 2006/0168515 A1 * | 7/2006 | Dorsett, Jr. .......... | G06F 40/143 |
| | | | 715/255 |
| 2011/0238409 A1 * | 9/2011 | Larcheveque ...... | G10L 15/1815 |
| | | | 704/9 |
| 2011/0238410 A1 * | 9/2011 | Larcheveque ........ | G06F 16/355 |
| | | | 704/9 |
| 2014/0052444 A1 * | 2/2014 | Roberge ................. | G10L 15/08 |
| | | | 704/243 |
| 2016/0259851 A1 * | 9/2016 | Hopkins ............... | G06F 40/216 |
| 2017/0069310 A1 * | 3/2017 | Hakkani-Tur .......... | G10L 15/22 |

(Continued)

OTHER PUBLICATIONS

Socher, Richard, et al. "Parsing with compositional vector grammars." Proceedings of the 51st Annual Meeting of the Association for Computational Linguistics (vol. 1: Long Papers). 2013. (Year: 2013).*

(Continued)

*Primary Examiner* — Jialong He
(74) *Attorney, Agent, or Firm* — Ballard Spahr LLP

(57) ABSTRACT

Voice inputs may be analyzed based on syntactic properties and respective dependency tree structure (e.g., parse tree) may be generated. Dependency tree structures may be grouped/clustered based on an associated root word/phrase. A visual interface may display the dependency tree structure in a manner that maps each voice input to a proper response (e.g., an action, an operation, a command, etc.). Mapping voice inputs to responses may be used to train a neural network.

34 Claims, 10 Drawing Sheets

(56) References Cited

U.S. PATENT DOCUMENTS

| | | | | |
|---|---|---|---|---|
| 2018/0182381 | A1* | 6/2018 | Singh | G06F 16/9537 |
| 2018/0300310 | A1* | 10/2018 | Shinn | G06F 40/289 |
| 2020/0020318 | A1* | 1/2020 | Canada | G10L 15/063 |
| 2020/0050940 | A1* | 2/2020 | Li | G06N 3/044 |

OTHER PUBLICATIONS

Tanveer, Md Iftekhar, and Ferhan Türe. "SyntaViz: Visualizing Voice Queries through a Syntax-Driven Hierarchical Ontology." Proceedings of the 2018 Conference on Empirical Methods in Natural Language Processing: System Demonstrations. 2018. (Year: 2018).*

Derrick, Donald, and Daniel Archambault. "TreeForm: Explaining and exploring grammar through syntax trees." Literary and linguistic computing 25.1 (2010): 53-66. (Year: 2010).*

Almeida-Martínez, Francisco J., and Jaime Urquiza-Fuentes. "Syntax trees visualization in language processing courses." 2009 Ninth IEEE International Conference on Advanced Learning Technologies. IEEE, 2009. (Year: 2009).*

Bird et al. "Natural Language Processing with Python", published by O'reilly, 2009. (Year: 2009).*

Petrov, "Announcing SyntaxNet: The World's Most Accurate Parser Goes Open Source", [online] https://research.google/blog/announcing-syntaxnet-the-worlds-most-accurate-parser-goes-open-source/, published in 2016. (Year: 2016).*

Tanveer et al: "SyntaViz: Visualizing Voice Queries through a Syntax-Driven Hierarchical Ontology", Proceedings of the 2018 Conference on Empirical Methods in Natural Language Processing: System Demonstrations, (2018), pp. 1-6.

European Search Report and Written Opinion were mailed on Nov. 27, 2019 by the European Patent Office for EP Application No. 19187405.6, filed on Jul. 20, 2018 and published as EP 3598436 on Jan. 22, 2020 (Applicant—Comcast Cable Communications, LLC) (9 Pages).

* cited by examiner

Total 1808812 queries loaded (1023997 unique)

Hierarchical Dependency Clusters

Current Cluster:

< None >

<<                                                                          >>

| idx | Cluster | Unique | Total |
|-----|---------|--------|-------|
| 0 | show VB ROOT | 85027 (8.30%) | 209424 (11.58%) |
| 1 | movies NNS ROOT | 39253 (3.83%) | 79973 (4.42%) |
| 2 | find VB ROOT | 28620 (2.79%) | 50885 (2.81%) |
| 3 | go VB ROOT | 24679 (2.41%) | 46096 (2.55%) |
| 4 | watch VB ROOT | 18486 (1.81%) | 40646 (2.25%) |
| 5 | want VBP ROOT | 18459 (1.80%) | 26365 (1.46%) |
| 6 | movie NN ROOT | 15835 (1.55%) | 20993 (1.16%) |
| 7 | turn VB ROOT | 15482 (1.51%) | 27439 (1.52%) |
| 8 | is VBZ ROOT | 13317 (1.30%) | 21502 (1.19%) |
| 9 | play VB ROOT | 12240 (1.20%) | 17018 (0.94%) |
| 10 | season NN ROOT | 9070 (0.89%) | 18155 (1.00%) |
| 11 | show NN ROOT | 8510 (0.83%) | 15906 (0.88%) |
| 12 | get VB ROOT | 8035 (0.78%) | 12470 (0.69%) |
| 13 | channel NN ROOT | 7859 (0.77%) | 10569 (0.58%) |
| 14 | shows VBZ ROOT | 7012 (0.68%) | 10196 (0.56%) |
| 15 | game NN ROOT | 6879 (0.67%) | 15078 (0.83%) |
| 16 | take VB ROOT | 6490 (0.63%) | 11022 (0.61%) |
| 17 | give VB ROOT | 6438 (0.63%) | 8642 (0.48%) |
| 18 | show VBP ROOT | 5947 (0.58%) | 7878 (0.44%) |
| 19 | episode NN ROOT | 5615 (0.55%) | 8383 (0.46%) |
| 20 | record VB ROOT | 4587 (0.45%) | 7610 (0.42%) |

610
DETERMINING A FIRST ROOT PHRASE

620
DETERMINING A FIRST DATA STRUCTURE

630
GENERATING A FIRST QUERY

640
DETERMINING A SECOND ROOT PHRASE

650
DETERMINING A SECOND DATA STRUCTURE

660
GENERATE A SECOND QUERY

670
DETERMINING A DATA CLUSTER THAT
CORRELATES THE FIRST QUERY TO THE SECOND QUERY

700

710
RECEIVE A PLURALITY OF VOICE INPUTS

720
DETERMINE A PLURALITY OF ROOT PHRASES

730
DETERMINE A PLURALITY OF REFERENCE VALUES

740
DETERMINE A PLURALITY OF CORRELATION VALUES

750
DETERMINE A PLURALITY OF RESPONSES

800

810
RECEIVE A PLURALITY OF VOICE INPUTS

820
DETERMINE A PLURALITY OF FIRST ROOT PHRASES

830
DETERMINE A PLURALITY OF SYNTACTIC TREES

840
DETERMINE A CLUSTER SET

850
DISPLAY THE CLUSTER SET

900

910
RECEIVE A FIRST VOICE INPUT

920
DETERMINE A FIRST ROOT PHRASE

930
DETERMINE A FIRST SYNTACTIC TREE

940
RECEIVE A SECOND VOICE INPUT

950
DETERMINE A SECOND ROOT PHRASE

960
DETERMINE A SECOND SYNTACTIC TREE

970
PROVIDE THE FIRST SYNTACTIC TREE AND THE SECOND SYNTACTIC TREE TO A VOICE ENABLED DEVICE

VISUALIZATION INTERFACE FOR VOICE INPUT

BACKGROUND

Voice enabled systems and devices rely on artificial intelligence, such as a neural network, to provide proper responses to natural language queries. The voice enabled systems and devices often fail to properly analyze a natural language query based on its syntactic structure to determine a proper response. As a result, the voice enabled systems and devices are unable to effectively train a neural network to provide proper responses to natural language queries. These and other shortcomings are addressed by the approaches set forth herein.

SUMMARY

It is to be understood that both the following general description and the following detailed description are explanatory only and are not restrictive. Provided are methods and systems for a visualization interface for voice input. A voice enabled device may receive voice inputs, such as natural language queries. The voice inputs may be analyzed based on syntactic properties. Voice inputs such as "I want to watch a movie," and "Show me a movie" may be analyzed based on a respective root word/phrase (e.g., "I want," "show me"), and a respective dependency tree structure (e.g., a parse tree) may be generated for each voice input. Each dependency tree structure may have a plurality of tags (e.g., parser labels) that indicate and/or are associated with a portion of the voice input (e.g., part of speech, etc.). The dependency tree structures may be grouped/clustered based on the respective root words/phrases. Each dependency tree structure may have a plurality of nodes configured to store and/or provide information (e.g. statistical data, etc.) related to at least a portion of the respective voice input. The voice inputs may be visualized and/or displayed in a manner that maps each voice input to a proper response (e.g., a specific intent, an operation, a command, etc.). The dependency tree structures may be used to generate/predict a response to voice inputs that the voice enabled device (or a device/system associated with the voice enabled device) may receive and/or process. The dependency tree structures may be used to train a neural network to predict and/or identify proper responses to voice inputs.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, provide illustrations and together with the description, serve to explain the principles of the methods and systems:

FIG. 3 is a diagram of a user interface;

DETAILED DESCRIPTION

Figure 1:
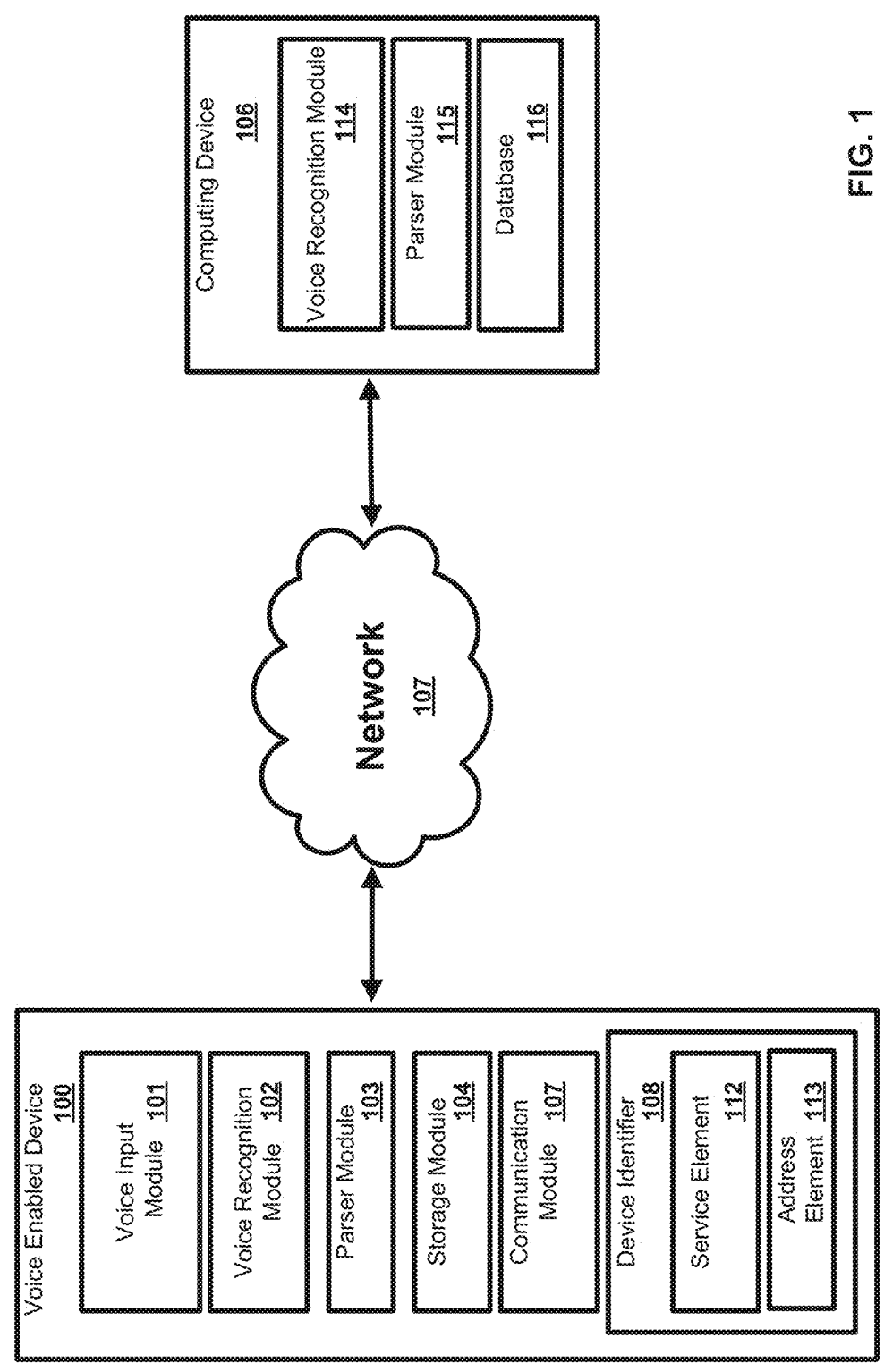
FIG. 1 is a diagram of system for a visualization interface for voice input.

Before the present methods and systems are described, it is to be understood that the methods and systems are not limited to specific methods, specific components, or to particular implementations. It is also to be understood that the terminology used herein is for the purpose of describing particular cases only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another range includes from the one particular value and/or to the other particular value. Similarly, when values are expressed as approximations, by use of the antecedent "about," it will be understood that the particular value forms another value. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Such as" is not used in a restrictive sense, but for explanatory purposes.

Components that may be used to perform the methods and systems are described herein, and it is understood that when combinations, subsets, interactions, groups, etc. of these components are described that while specific reference of each various individual and collective combinations and permutation of these may not be explicitly disclosed, each is specifically contemplated and described herein, for all methods and systems. This applies to all parts of this application including, but not limited to, steps in described methods. Thus, if there are a variety of additional steps that may be performed it is understood that each of these additional steps may be performed with any specific step or combination of steps of the described methods.

As will be appreciated by one skilled in the art, the methods and systems may be implemented using entirely hardware, entirely software, or a combination of software and hardware. Furthermore, the methods and systems may take the form of a computer program product on a computer-readable storage medium having computer-readable program instructions (e.g., computer software) encoded thereon. More particularly, the described methods and systems may take the form of web-implemented computer software. Any suitable computer-readable storage medium may be utilized including hard disks, CD-ROMs, optical storage devices, or magnetic storage devices.

The methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions, and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Note that in various cases described herein reference may be made to a given entity performing some action. It should be understood that this language may in some cases mean that a system (e.g., a computer) owned and/or controlled by the given entity is actually performing the action.

Described herein are methods and systems for a visualization interface for voice input. Voice inputs (e.g., natural language queries, voice commands, etc.) may be processed based on syntactic properties (e.g., syntax parsing) to determine a root word/phrase. The root word/phrase may be determined to be at the top of a hierarchy. Other terms in the voice input may be analyzed based on a relationship to the root word/phrase to determine a meaning of the voice input and provide a response.

A voice enabled device (e.g., a computing device, a smart device, etc.) may receive a plurality of voice inputs. The voice enabled device may also receive a plurality of natural language queries and/or commands. The voice enabled device may receive the plurality of voice inputs via a sensor (e.g., a microphone, etc.). The voice enabled device may have one or more speech recognition modules configured to interpret the plurality of voice inputs. The voice enabled device may determine a result, a response, an intent, and/or the like of each of the plurality of voice inputs. The voice enabled device may perform speech-to-text operations that translate each of the plurality of voice inputs to respective text, a plurality of characters, and/or the like. The voice enabled device may apply one or more speech/language recognition algorithms to a voice input and extract a word or a plurality of words (e.g., a phrase) from the voice input.

Each of the plurality of voice inputs may be analyzed based on syntactic properties and/or a hierarchical order. Voice inputs, such as "I want to watch a movie," or "Show me a movie," may be analyzed and, based on a root word/phrase (e.g., "I want," "show me," etc.), a respective dependency tree structure (e.g., a data structure, a syntactic tree, a parse tree, etc.) may be generated for each voice input. Each dependency tree structure may have a plurality of tags (e.g., parser labels, etc.) that indicate and/or are associated with a portion of a respective voice input (e.g., a part of speech, etc.). The plurality of tags may include tags such as "NN" (e.g., a noun), "VB" (e.g., a verb), "JJ" (e.g., an adjective), "RB" (e.g., an adverb), combinations thereof, and the like. Each dependency tree structure may be stored as a query set (e.g., a data set, a file, a record, etc.) and associated with an identifier. The identifier may be used as an indicator and/or a classifier of the respective voice input. The identifier may be used to retrieve, provide, send, receive, and the like any information associated with a respective dependency tree structure (e.g., query set).

A plurality of voice inputs may yield a plurality of dependency tree structures (e.g., data structures, syntactic trees, parse trees, query sets, etc.). The plurality of dependency tree structures may be grouped and/or associated with each other. At least portion of the plurality of dependency tree structures may be grouped and/or associated based on a respective root word/phrase. The plurality of dependency tree structures may be grouped and/or associated based on any relationship, property, or the like. Dependency tree structures may be grouped and/or associated to form dependency tree clusters (e.g., query clusters, cluster sets, data clusters, etc.). A plurality of dependency tree structures may yield a plurality of dependency tree clusters. The plurality of dependency tree clusters may be sorted. The plurality of dependency tree clusters may be sorted based on a total frequency of voice inputs (e.g., natural language queries, queries, etc.) associated with a respective dependency tree cluster.

The plurality of dependency tree structures and/or the plurality of dependency tree clusters may be visualized and/or displayed. A user interface may be generated to visualize and/or display the plurality of dependency tree structures and/or the plurality of dependency tree clusters. Displayed dependency tree structures (e.g., data structures, syntactic trees, parse trees, query sets, etc.) and/or dependency tree clusters (e.g., query clusters, cluster sets, data clusters, etc.) may be associated with information/data. Each dependency tree structure may have a plurality of nodes configured to store and/or provide information (e.g., statistical data, etc.) related to at least a portion of the respective voice input. The voice inputs may be visualized and/or displayed in a manner that maps each voice input to a proper response (e.g., an action, a correct response, an intent, an operation, a command, etc.). A user may access a user interface displaying the plurality of dependency tree structures and/or the plurality of dependency tree clusters. A user may click on a displayed dependency tree cluster (e.g., query clusters, cluster sets, data clusters, etc.) and the dependency tree cluster may reveal (e.g., expand, show, etc.) all voice inputs (e.g., natural language queries, queries, dependency tree clusters, query clusters, cluster sets, data clusters, etc. associated with the dependency tree cluster and/or a proper response (e.g., an action, a correct response, an intent, an operation, a command, etc.) associated with each of the voice inputs.

The dependency tree structures may be used to generate/predict responses to voice inputs the voice enabled device (or a device/system associated with the voice enabled device) may receive. The dependency tree structures may be associated with a neural network. The dependency tree structures may be used to train a neural network to predict and/or identify proper responses (e.g., actions, correct responses, intents, operations, commands, etc.) to voice inputs.

FIG. 1 shows an environment in which the described methods and systems may operate. Those skilled in the art will appreciate that the described methods may be used in various types of networks and systems that employ both digital and analog equipment. One skilled in the art will appreciate that provided herein is a functional description and that the respective functions may be performed by software, hardware, or a combination of software and hardware.

An operating environment may be a voice enabled device 100 (e.g., a computing device, a smart device, etc.). The voice enabled device 100 may be in communication with a network such as a network 117. The network 117 may be a network such as the Internet, a wide area network, a local area network, a cellular network, a satellite network, and the like. Various forms of communications may occur via the network 117. The network 117 may be capable of wired and wireless communications and communication techniques.

The voice enabled device 100 may be associated with a device identifier 108. The device identifier 108 may be any identifier, token, character, string, or the like, for differentiating one voice enabled device from another voice enabled device. The device identifier 108 may identify the voice enabled device 100 as belonging to a particular class of voice enabled devices. Also, the device identifier 108 may represent information relating to the voice enabled device 100 such as a manufacturer, a model or type of device, a service provider associated with the voice enabled device 100, a state of the voice enabled device 100, a locator, and/or a label or classifier. Other information may be represented by the device identifier 108.

The device identifier 108 may have an address element 113 and a service element 112. The address element 113 may represent or provide an internee protocol address, a network address, a media access control (MAC) address, an Internet address, or the like. The address element 113 may be relied upon to establish a communication session between the voice enabled device 100 and a computing device 106 (and/or other devices/networks). The address element 113 may be used as an identifier or locator of the voice enabled device 100.

The service element 112 may represent an identification of a service provider and/or service (e.g., voice input analysis service, etc.) associated with the voice enabled device 100. The service element 112 may represent information relating to or provided by a communication service provider (e.g., an Internet service provider) that is providing or enabling data flow such as communication services to the voice enabled device 100. The address element 113 may be used to identify or retrieve data from the service element 112, or vice versa. One or more of the address element 113 and the service element 112 may be stored remotely from the voice enabled device 100 and retrieved by one or more devices such as the voice enabled device 100 and/or and the computing device 106. Other information may be represented by the service element 112.

The voice enabled device 100 may have a voice input module 101 for receiving a voice input, such as a natural language query. The voice input module 101 may receive a voice input based on a user speaking within proximity (e.g., near, close to, etc.) of the voice enabled device 100. The voice input module 101 may consist of one or more microphones, speakers, combinations thereof, and the like. The one or more microphones, speakers, combinations thereof, and the like may receive the voice input from the user. The voice input module 101 may receive a voice input (or a plurality of voice inputs) by other means. The voice input module 101 may receive a plurality of voice inputs via a data transfer, a download, a content source, a network, and/or the like. The voice input module 101 may receive voice inputs by/based on any suitable method.

The voice input module 101 may provide the voice input (or the plurality of voice inputs) to a voice recognition module 102. The voice recognition module 102 may process the voice input. The voice recognition module 102 may perform speech-to-text operations that translate a voice input to text, a plurality of characters, and/or the like. The text, the plurality of characters, and/or the like may be mapped to and/or associated with information/data stored in storage (e.g., a storage module 104, a database 116, etc.). The voice recognition module 102 may apply one or more speech/language recognition algorithms to the voice input to determine a word (e.g., root word, etc.) or plurality of words (e.g., a sentence, a phrase, etc.).The voice recognition module 102 may provide the voice input and/or related word/plurality of words (e.g., text, a sentence, a phrase, etc.) to a parser module 103, The parser module 103 may parse the voice input and/or related word/plurality of words (e.g., text, a sentence, a phrase, etc.) to determine syntactic and semantic information. The voice input may be analyzed based on syntactic properties and hierarchical order (e.g., based on a root word/phrase, etc.). The parser module 103 may parse the voice input to produce a parsed sentence. A parsed sentence may consist of a root word and a string of words, with each word being associated with a part of speech in the parsed sentence. A voice input such as "I want to watch a movie" may be analyzed and, based on a root word/phrase "I want," a respective dependency tree structure (e.g., a data structure, a syntactic tree, a parse tree, etc.) may be generated. A voice input such as "Show me a movie" may be analyzed and, based on a root word/phrase "show me," a respective dependency tree structure may be generated. A dependency tree structure may have a plurality of tags (e.g., parser labels) that indicate and/or are associated with a portion of the respective voice input (e.g., a part of speech, etc.). The plurality of tags may include tags such as "NN" (e.g., a noun), "VB" (e.g., a verb), "JJ" (e.g., an adjective), "RB" (e.g., an adverb), combinations thereof, and the like, Table 1 is an example list of tags with corresponding parts of speech.

TABLE 1

| | TAG | PART OF SPEECH |
|---|---|---|
| 1. | CC | coordinating conjunction |
| 2. | CD | cardinal number |
| 3. | DT | determiner |
| 4. | EX | existential there |
| 5. | FW | foreign word |
| 6. | IN | preposition or subordinating conjunction |
| 7. | JJ | adjective |
| 8. | JJR | adjective, comparative |
| 9. | JJS | adjective, superlative |
| 10. | LS | list item marker |
| 11. | MD | modal |
| 12. | NN | noun, singular or mass |
| 13. | NNS | noun, plural |
| 14. | NNP | proper noun, singular |
| 15. | NNPS | proper noun, plural |
| 16. | PDT | predeteminer |
| 17. | POS | possessive ending |
| 18. | PRP | personal pronoun |

TABLE 1-continued

| | TAG | PART OF SPEECH |
|---|---|---|
| 19. | PRP$ | possessive pronoun |
| 20. | RB | adverb |
| 21. | RBR | adverb, comparative |
| 22. | RBS | adverb, superlative |
| 23. | RP | particle |
| 24. | SYM | symbol |
| 25. | TO | to |
| 26. | UH | interjection |
| 27. | VB | verb, base form |
| 28. | VBD | verb, past tense |
| 29. | VBG | verb, gerund or present participle |
| 30. | VBN | verb, past participle |
| 31. | VBP | verb, non-$3^{rd}$ person singular present |
| 32. | VBZ | verb, $3^{rd}$ person singular present |
| 33. | WDT | wh-determiner |
| 34. | WP | wh-pronoun |
| 35. | WP$ | possessive wh-pronoun |
| 36. | WRB | wh-adverb |

The parser module 103 may employ robust parsing to accommodate many diverse types of voice inputs (e.g., natural language queries, queries, etc.), including full and partial sentences, meaningful phrases, and independent search terms. A parsed sentence may be represented and/or stored as a dependency tree structure (e.g., a data structure, a syntactic tree, a parse tree, query set, etc.). To store the dependency tree structure, the voice enabled device 100 may have a storage module 104. The storage module 104 may store any information/data. The storage module 104 may store syntactic and/or language rules/information (e.g., pre-defined information, etc.) used to parse the voice input. A dependency tree structure may be stored as a query set (e.g., a data set, a file, a record, etc.) and associated with an identifier. An identifier associated with a dependency tree structure may be used as an indicator and/or classifier of an associated voice input. An identifier associated with a dependency tree structure may be encoded and/or decoded. An identifier associated with a dependency tree structure may be based on metadata, lexical tokens, and/or the like. An identifier associated with a dependency tree structure may be any type of identifier.

The voice enabled device 100 may be provided with a corpus of information/data associated with voice inputs (e.g., natural language queries, queries, etc.). The corpus of information/data associated with voice inputs may consist of information/data such as a. plurality of queries and respective responses (e.g., deep learning responses to queries, actions, etc.), predefined answers (e.g., answers to queries based on statistics and/or frequency of occurrence, etc.), information provided by one or more content sources (e.g., search engine responses, user provided information, etc.), combinations thereof, or the like. The parser module 103 may generate a predictive tree structure (e.g., a dependency tree structure, a parse tree, a data structure, a syntactic tree, a logical tree, etc.) for portions of the corpus of information/data associated with voice inputs. The parser module 103 may generate a respective predictive tree structure for a preloaded query, such as "Show me a movie," that associates a dependency tree structure for the preloaded query with a predictive response (e.g., a proper response, an action, a correct response, an intent, an operation, a command, etc.). A plurality of predictive tree structures may be generated/created. Each predictive tree structure of the plurality of predictive tree structures may be associated with and/or matched with a least a portion of the corpus of information/data associated with voice inputs. The plurality of predictive tree structures may be retained in storage (e.g., the storage module 104). Each predictive tree structure of the plurality of predictive tree structures may be associated with a relevancy identifier. A relevancy identifier associated with a predictive tree structure may be used as an indicator and/or classifier of an associated portion of the corpus of information/data associated with voice inputs. A relevancy identifier associated with a predictive tree structure may be encoded and/or decoded. A relevancy identifier associated with a predictive tree structure may be based on metadata, lexical tokens, and/or the like. A relevancy identifier associated with a predictive tree structure may be any type of identifier.

The voice input module 101 may be configured to not provide the voice input (or the plurality of voice inputs) to the voice recognition module 102. The voice enabled device 100 may provide the voice input (or the plurality of voice inputs) to the computing device 106. The voice enabled device 100 may establish a communication session with the computing device 106 to provide the voice input (or the plurality of voice inputs) to the computing device 106. The voice enabled device 100 may establish a communication session with the computing device 106 based on a short-range communication technique (e.g., Bluetooth, near-field communication, infrared, etc.) via the network 117. The voice enabled device 100 may establish a communication session with the computing device 106 based on a long-range communication technique (e.g., a Wi-Fi signal, a wireless signal, an Internet message, an automated phone call, a SMS message, etc.) via the network 117. The voice enabled device 100 may establish a communication session with the computing device 106 based on any suitable means/method (e.g., an application program interface (API), etc.).

The computing device 106 may have a voice recognition module 114. The voice recognition module 114 may process the voice input (or the plurality of voice inputs). The voice recognition module 114 may perform speech-to-text operations that translate a voice input to text, a plurality of characters, and/or the like. The text, the plurality of characters, and/or the like may be mapped to and/or associated with information/data stored in storage (e.g., the storage module 104, the database 116, etc.). The voice recognition module 114 may apply one or more speech/language recognition algorithms to the voice input to determine a word (e.g., a root word, etc.) or plurality of words (e.g., a root phrase, a sentence, a portion of a sentence, a phrase, a sub-phrase etc.). The voice recognition module 114 may provide the voice input and/or related word/plurality of words (e.g., text, a sentence, a phrase, etc.) to a parser module 115.

The parser module 115 may parse the voice input and/or related word/plurality of words (e.g., text, sentence, phrase, etc.) to determine syntactic and semantic information in the same manner and/or by the same means described for the parser module 103. The parser module 115 may employ robust parsing to accommodate many diverse types of voice inputs (e.g., natural language queries, queries, etc.), including full and partial sentences, meaningful phrases, and independent search terms. The parser module 115 may parse the voice input and/or related word/plurality of words and store the parsed voice input and/or related word/plurality of words in a database 116. A parsed sentence may be represented and/or stored as a dependency tree structure (e.g., a data structure, a syntactic tree, a parse tree, query set, etc.). The database 116 may operate in the same and/or similar manner as described for the storage module 104. The database 116 may store any information/data. The database 116 may store syntactic and/or language rules/information used to parse the voice input. A dependency tree structure may be stored in the database 116 as a query set (e.g., a data set, a file, a record, etc.) and associated with an identifier. The identifier may be used as an indicator and/or classifier of the voice input.

The computing device 106 may be provided with a corpus of information/data associated with voice inputs (e.g., natural language queries, queries, etc.). The corpus of information/data associated with voice inputs may consist of information/data such as a plurality of queries and respective responses (e.g., deep learning responses to queries, etc.), predefined answers (e.g., answers to queries based on statistics and/or frequency of occurrence, etc.), information provided by one or more content sources (e.g., search engine responses, user provided information, etc.), combinations thereof, or the like. The parser module 115 may generate a predictive tree structure (e.g., a dependency tree structure, a parse tree, a data structure, a syntactic tree, a logical tree, etc.) for portions of the corpus of information/data associated with voice inputs. The parser module 115 may generate a respective predictive tree structure for a preloaded query, such as "Show me a movie," that associates a dependency tree structure for the preloaded query with a predictive response, action, etc. A plurality of predictive tree structures may be generated/created. Each predictive tree structure of the plurality of predictive tree structures may be associated with and/or matched with a least a portion of the corpus of information/data associated with voice inputs. The plurality of predictive tree structures may be retained in storage (e.g., the database 116, the storage module 104, etc.). Each predictive tree structure of the plurality of predictive tree structures may be associated with a relevancy identifier. A relevancy identifier associated with a predictive tree structure may be used as an indicator and/or classifier of an associated portion of the corpus of information/data associated with voice inputs. A relevancy identifier associated with a predictive tree structure may be encoded and/or decoded. A relevancy identifier associated with a predictive tree structure may be based on metadata, lexical tokens, and or the like. A relevancy identifier associated with a predictive tree structure may be any type of identifier.

The parser module 115 may parse a voice input and/or related word/plurality of words, and the parsed voice input (e.g., the data indicative of the parsed voice input) may be sent/provided to the voice enabled device 100 via a communication session (e.g., a short-range communication session, a long-range communication session, etc.) supported by the network 117. The parser module 115 may generate/create the plurality of predictive tree structures, and the plurality of predictive tree structures may be sent/provided to the voice enabled device 100 via the communication session.

A dependency tree structure may be converted/translated into an expression (e.g., a vector, a collection of vectors, a set of expressions, etc.) that represents the meaning of the respective voice input. The voice enabled device 100 may use the expression (e.g., a vector, a collection of vectors, a set of expressions, etc.) to determine a proper response (e.g., an action, a correct response, an intent, an operation, a command, etc.) associated with a voice input. The voice enabled device 100 may have a vectorization module 105. The vectorization module 105 may convert/translate a dependency tree structure associated with a voice input to a vector representation. Every part of speech (e.g., phrase, sub-phrase, etc.) of the voice input and an associated portion of a dependency tree structure (e.g., sub-dependency tree, portion of a query set, etc.) may be represented by a vector. Each part of speech (e.g., phrase, sub-phrase, etc.) of the voice input and the associated portion of the dependency tree structure may be a dimension of the voice input and the associated portion of the dependency tree structure. A voice input and associated dependency tree structure may have any number of dimensions (e.g., n-dimensions, any number of portions, any number of branches, any number of sub-dependency trees, etc.) based a root word/phrase. A dependency tree structure may be generated/created for a voice input, such as "I want to watch a movie," and the root word/phrase "I want" may be represented by a vector. Every other part of speech (e.g., every portion of the dependency tree structure, sub-dependency tree, etc.) of the voice input (e.g., sub-phrase, "to," "watch," "a," "movie," "to watch a movie," etc.) may also be represented by a vector. Each dimension may correspond to a part of speech associated with a respective voice input and/or portion of the dependency tree structure. Each vector associated with a voice input/dependency structure may be added (e.g., element-wise) and/or averaged to generate/create a resultant vector associated with the voice input. The resultant vector may be normalized to a fixed vector length. Normalization may be performed using any of a variety of well-known and established techniques. A plurality of vector representations of a plurality of dependency tree structures and/or a plurality of resultant vectors associated with the plurality of vector representations may be retained in storage (e.g., storage module 104, database 116).

The vectorization module 105 may convert/translate a predictive tree structure into a vector representation. Every portion (e.g., part of speech, sub-phrase, etc.) of a predictive tree structure may be represented by a vector. Predetermined information/data from the corpus of information/data associated with voice inputs (e.g., natural language queries, queries, etc.) may be represented as a vector(s). The corpus of information/data associated with voice inputs may consist of predefined/provided information associated with a voice input, such as"I want to watch a movie." A predictive tree structure may be generated/created and the root word/phrase "I want" may be represented by a vector. Every other part of speech (e.g., every portion of the predictive tree structure, sub-predictive tree, etc.) of the voice input (e.g., sub-phrase, "to," "watch," "a," "movie," "to watch a movie," etc.) may be also be represented by a vector. Each vector associated with the predefined/provided information/predictive structure may be added (e.g., element-wise) and/or averaged to generate/create a resultant vector associated with the predefined/provided information. The resultant vector may be normalized to a fixed vector length. Normalization may be performed using any of a variety of well-known and established techniques. A plurality of vector representations of a plurality of predictive tree structures and/or a plurality of resultant vectors associated with the plurality of vector representations of the corpus of information/data associated with voice inputs may be stored in storage (e.g., storage module 104, database 116).

The plurality of vector representations of the plurality of dependency tree structures, the plurality of resultant vectors associated with the plurality of vector representations, the plurality of vector representations of the plurality of predictive tree structures, and the plurality of resultant vectors associated with the plurality of vector representations of the corpus of information/data associated with voice inputs may be provided to a relevancy ranking module 117. The relevancy ranking module 117 may provide an efficient, computationally concise ranking of the plurality of vector representations of the plurality of dependency tree structures and the plurality of resultant vectors associated with the plurality of vector representations, based on the plurality of vector representations of the plurality of predictive tree structures, and the plurality of resultant vectors associated with the plurality of vector representations of the corpus of information/data associated with voice inputs. The relevancy ranking module 117 may perform a dot-product operation between a resultant vector associated with each dependency tree structure of the plurality of dependency tree structures and a resultant vector associated with each predictive tree structure of the plurality of predictive tree structures. The relevancy ranking module 117 may rank the plurality of predictive tree structures in order of the dot-product result. The relevancy ranking module 117 may rank the plurality of predictive tree structures in order of the dot-product result from a largest value (most relevant) to a smallest value (least relevant). The relevancy ranking module 117 may employ any suitable means/method of ranking. The rankings may be stored in storage (e.g., storage module 104, database 116). The rankings may be used to determine and/or predict a proper response (e.g., an action, a correct response, an intent, an operation, a command, etc.) associated with a voice input. The voice enabled device 100 may employ different strategies to determine and/or predict a proper response (e.g., an action, a correct response, an intent, an operation, a command, etc.) associated with a voice input. The voice enabled device 100 may have a semantics module 105. The semantics module 105 may determine a proper response (e.g., an action, a correct response, an intent, an operation, a command, etc.) associated with a voice input. The semantics module 105 may map words (e.g., keywords), phrases, and/or concepts to pre-defined information stored in the storage module 104. The semantics module 105 may identify related templates stored in the storage module 104 that associate words and/or phrases to the corpus of information/data associated with voice input such as deep learning responses, predefined answers, information provided by one or more content sources, combinations thereof, or the like.

The semantics module 105 may determine a result, response, intent, and/or the like associated with a voice input based on relevancy identifier associated with a predictive tree structure. A relevancy identifier may be a fixed-length integer representation (e.g., integers 1-10 , etc.) of a predictive tree structure, in which a conceptual relationship (e.g., a match, a dose relationship, etc.) to a voice input corresponds to numerical relationship. A root word/phrase associated with a voice input/dependency tree structure may be represented by an arbitrary integer value (e.g., 10, etc.). The arbitrary integer value may be determined by any means. The semantics module 105 may determine the integer values based on term frequency-inverse document frequency (TFIDF). TDIDF may be used to determine a numerical value (e.g., integer value statistical value, etc.) that reflects a number of times a root word/phrase appears within stored information/data (e.g., the corpus of information/data associated with voice inputs, information/data stored in storage module 104, information/data stored in database B, etc.), and the like). The semantics module 105 may utilize an algorithm that yields a rough estimate of the relative conceptual relationship of a predictive tree structure. Integer representations for "show me," as in "show me a movie," and "1 want," as in "I want to watch a movie," may be conceptually nearer than integer representations for "show me," and "what time," as in "what time does Game of Thrones come on?" A root word/phrase associated with a voice input may be "show me," and may be assigned an integer value of ten (10). A root word/phrase associated with a predictive tree structure may be "I want," and may be assigned an integer value of nine (9). A root word/phrase associated with a predictive tree structure may be "what time," and may be assigned an integer value of seven (7). A difference between the integer representations of "show me" and "I want," (e.g. a difference between ten and nine) may yield a smaller integer value (e.g., 10−9=1) than a difference between integer representations of "show me" and "what time" (e.g., 10−7=3; 1 <3). The semantics module 105 may associate predictive tree structures and respective responses to a voice input based on a threshold associated with integer representations. The semantics module 105 may associate predictive tree structures and respective responses to a voice input that have a difference between the integer representations that is less than a threshold (e.g., less than a specific integer value, less than 2, etc.).

The voice enabled device 100 may process a large quantity of voice inputs (e.g., a plurality of voice inputs, etc.) in the manner described. A plurality of voice inputs may yield a plurality of dependency tree structures (e.g., data structures, syntactic trees, parse trees, query sets, etc.). The plurality of dependency tree structures may be grouped and/or associated with each other. At least a portion of the plurality of dependency tree structures may be grouped and/or associated based on a respective root word/phrase. The plurality of dependency tree structures may be grouped and/or associated based on any relationship, property, or the like, Dependency tree structures may be grouped and/or associated to form dependency tree clusters (e.g., cluster sets, data clusters, etc.). Dependency tree clusters may be stored in the storage module 104 (or the database 116). A plurality of dependency tree structures may yield a plurality of dependency tree clusters. The plurality of dependency tree clusters may be sorted. The plurality of dependency tree clusters may be sorted based on a total frequency of voice inputs (e.g., natural language queries, queries, etc.) associated with a respective dependency tree cluster. The plurality of dependency tree clusters may be sorted according to any method or based on any property (e.g., root word, like terms, unique voice inputs/queries, total amount of voice inputs/ queries, etc.) associated with the plurality of dependency tree clusters.

A plurality of voice inputs may be processed and recorded. A plurality of voice inputs may be stored in the storage module 104 and associated with an identifier (e.g., indicator, classifier, etc.). A plurality of voice inputs may be repeatedly processed and recorded to generate a corpus of voice inputs and associated results, responses, intents, and/ or the like, to generate a language model that may be used to train a neural network.

The process of determining and/or predicting a proper response (e.g., an action, a correct response, an intent, an operation, a command, etc.) associated with a voice input may be recursive. Dependency tree structures and/or dependency tree clusters may be used to generate/predict proper responses (e.g., actions, correct responses, intents, operations, commands, etc.) associated with a large quantity and/or variety of voice inputs the voice enabled device 100 (or a device/system associated with the voice enabled device) may receive and/or process. The dependency tree structures and/or dependency tree clusters may be associated with a neural network. The dependency tree structures and/or dependency tree clusters may be used to train the neural network to predict and/or identify proper responses (e.g., actions, correct responses, intents, operations, commands, etc.) associated with voice inputs. The voice enabled device 100 may be used to train the neural network to provide a proper response (e.g., an action, a correct response, an intent, an operation, a command, etc.) associated with any voice input the neural network or a device associated with the neural network may receive and/or process.

Training a neural network may involve providing the neural network with input data (e.g., voice inputs, dependency tree structures, dependency tree clusters, query clusters, cluster sets, data clusters, etc.) that the neural network may associate with a response (e.g., an action, a correct response, an intent, an operation, a command, etc.) in a one-to-one mapping as a training sample. The mapping may be learned by the neural network in a training phase. The mapping may consist of coding one or more associations between the input data and a response with weighted values (e.g., measurable worth, etc.). The neural network may have one or more computation nodes that use multiple layer perceptrons to map portions of the input data (e.g., a portion of a voice input, a portion of a dependency tree structure, a portion of a dependency tree cluster, a portion of a query cluster, a portion of a cluster set, a portion of a data cluster, etc.) to a response or a portion of a response according to a logistic function. Mapped data (e.g., input data mapped to a response) may be given weighted values. Future inputs (e.g., input data, voice inputs, dependency tree structures, dependency tree clusters, query clusters, cluster sets, data clusters, etc.) that are similar to those in the training sample may be given weighted values appropriately. The weighted values may be used to determine a "better" response whenever input data maps to one or more responses. By comparing the weighted values to threshold values and/or probabilistically selecting which matches between input data and responses to be retained.

Training a neural network may be recursive. Training a neural network may involve using a back propagation algorithm that implements mapping of input data (e.g., voice inputs, dependency tree structures, dependency tree clusters, query clusters, cluster sets, data clusters, etc.) and responses (e.g., actions, intents, operations, commands, etc.), such that error in mapping the input data to the responses is minimized. The back propagation algorithm may accelerate training of a neural network. Training a neural network may also involve reducing an amount of time required for the voice enabled device 100 and/or the neural network to process voice inputs. An amount of time required for the voice enabled device 100 (and/or any device associated with a neural network) to process voice inputs (e.g., map voice inputs to responses, etc.) for voice inputs that are routine, common, and/or of repeat occurrence may be reduced. A processing time (e.g., time required to associate a voice input with a response, etc.) associated with voice inputs that begin with (e.g., a root word/phrase, etc.) and/or consist of "show me," such as, "show me a movie," "show me an action movie," "show me a television show," and the like, may be reduced because the voice enabled device 100 may already have (e.g., stored in storage, stored in the storage module 104, stored in the database 114, etc.) dependency tree structures and/or dependency tree clusters that predict/ associate at least a portion of the voice input to a response (e.g., predefined information, etc.). Processing times associated with voice inputs may be persistently reduced based on a recursiveiterative process of determining and/or predicting proper responses associated with the voice inputs. The ability of the voice enabled device 100 to provide/ predict responses to voice inputs based on input data (e.g., dependency tree structures, dependency tree clusters, query sets, cluster sets, data clusters, etc.) may be used in a variety of technologies and applications, such as artificial intelligence (AI).

The voice enabled device 100 may have an interface module 109. The interface module 109 may provide an interface to a user to interact with the voice enabled device 100 and/or the computing device 106. The interface module 109 may use any interface (e.g., graphical user interface, user interface, etc.) for presenting and/or receiving information to/from the user. The interface module 109 may request or query various files from a local source and/or a remote source (e.g., storage module 104, database 116, etc.). The interface module 109 may request or query various files associated with the plurality of dependency tree structures and/or the plurality of dependency tree clusters. The interface module 109 may request or query various tiles associated with the plurality of dependency tree structures and/or the plurality of dependency tree clusters to display the plurality of dependency tree structures and/or the plurality of dependency tree clusters.

The plurality of dependency tree structures and/or the plurality of dependency tree clusters may be visualized and/or displayed. The interface module 109 may generate and/or provide a user interface (e.g., graphical user interface, user interface, etc.) to visualize and/or display the plurality of dependency tree structures and/or the plurality of dependency tree clusters. Displayed dependency tree structures (e.g., data structures, syntactic trees, parse trees, query sets, etc.) and/or dependency tree clusters (e.g., cluster sets, data clusters, etc.) may be associated with information/data. Each dependency tree structure may consist of a plurality of nodes configured to store and/or provide information (e.g. statistical data, etc.) related to at least a portion of the respective voice input. The voice inputs visualized and/or displayed in a manner that maps each voice input to a proper response (e.g., an action, a correct response, an intent, an operation, a command, etc.) determined by the semantics module 105. A user may access the interface module 109 to visualize a voice input and/or a plurality of voice inputs. The user may access the interface module 109 while the plurality of dependency tree structures and/or the plurality of dependency tree clusters are displayed. The user may access a displayed dependency tree (e.g., data structure, syntactic tree, parse tree, query set, etc.) cluster. The user may click on a displayed dependency tree cluster and the dependency tree cluster may reveal (e.g., expand, show, etc.) all voice inputs (e.g., natural language queries, queries, etc.) associated with the dependency tree cluster and/or a response associated with each of the voice inputs. Each dependency tree structure and/or dependency tree cluster may consist of a plurality of nodes configured to store and/or provide information (e.g. statistical data, etc.) related to at least a portion of the respective voice input. The plurality of nodes may be configured as hyperlinks accessible via the user interface (e.g., graphical user interface, user interface, etc.). The plurality of nodes may be configured in any suitable method or related means. The user interface (e.g., graphical user interface, user interface, etc.) may display additional information (e.g., a histogram of actions/responses related to a dependency tree cluster, etc.).

Figure 2:
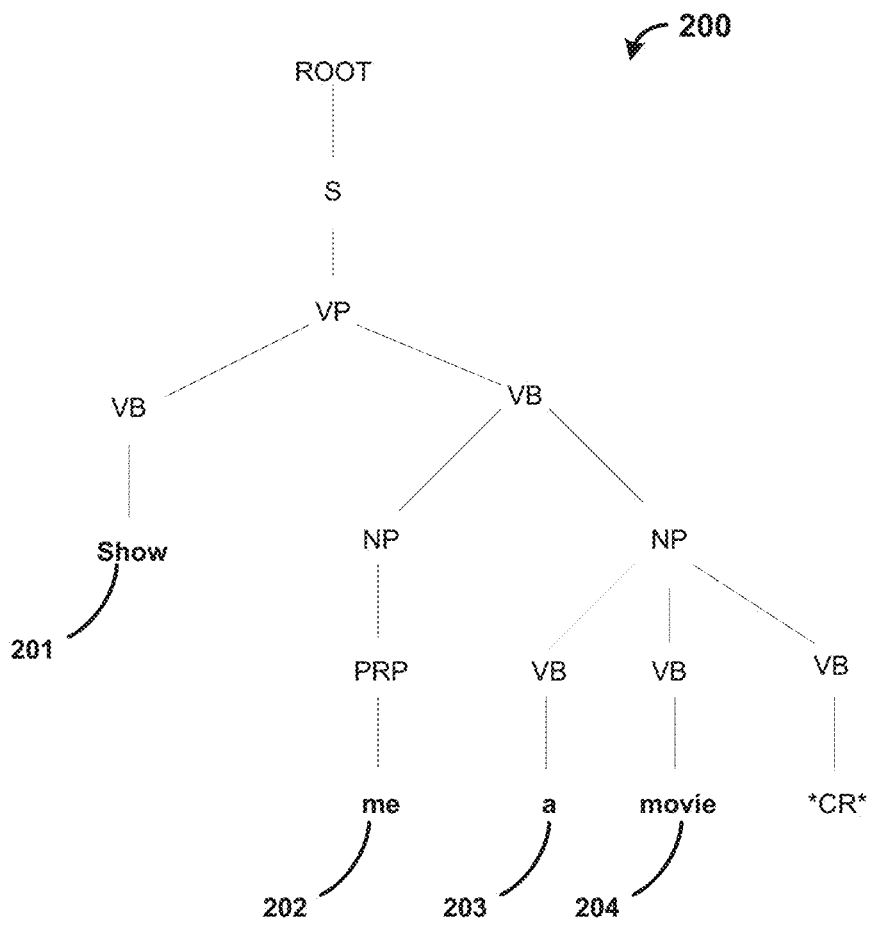
FIG. 2 is diagram of dependency tree structure for a voice input.

FIG. 2 is an example dependency tree structure 200 (e.g., data structure, syntactic tree, parse tree) that may be generated (e.g., generated by parser module 103, generated by parser module 115, etc.) for a voice input, such as "Show me a movie." The dependency tree structure 200 may have a top-down construction such that the dependency tree structure 200 is generated based on a root word/phrase 201 (e.g., "show"). Each word (202, 203, 204) of the voice input "Show me a movie" would be part of the dependency tree structure 200 based on a predetermined grammar that relies on a relationship between the terms. The dependency tree structure 200 may have a plurality of tags associated with parts of speech of the voice input "Show me a movie." Definitions for the tags are described in Table 1.

Figure 4:
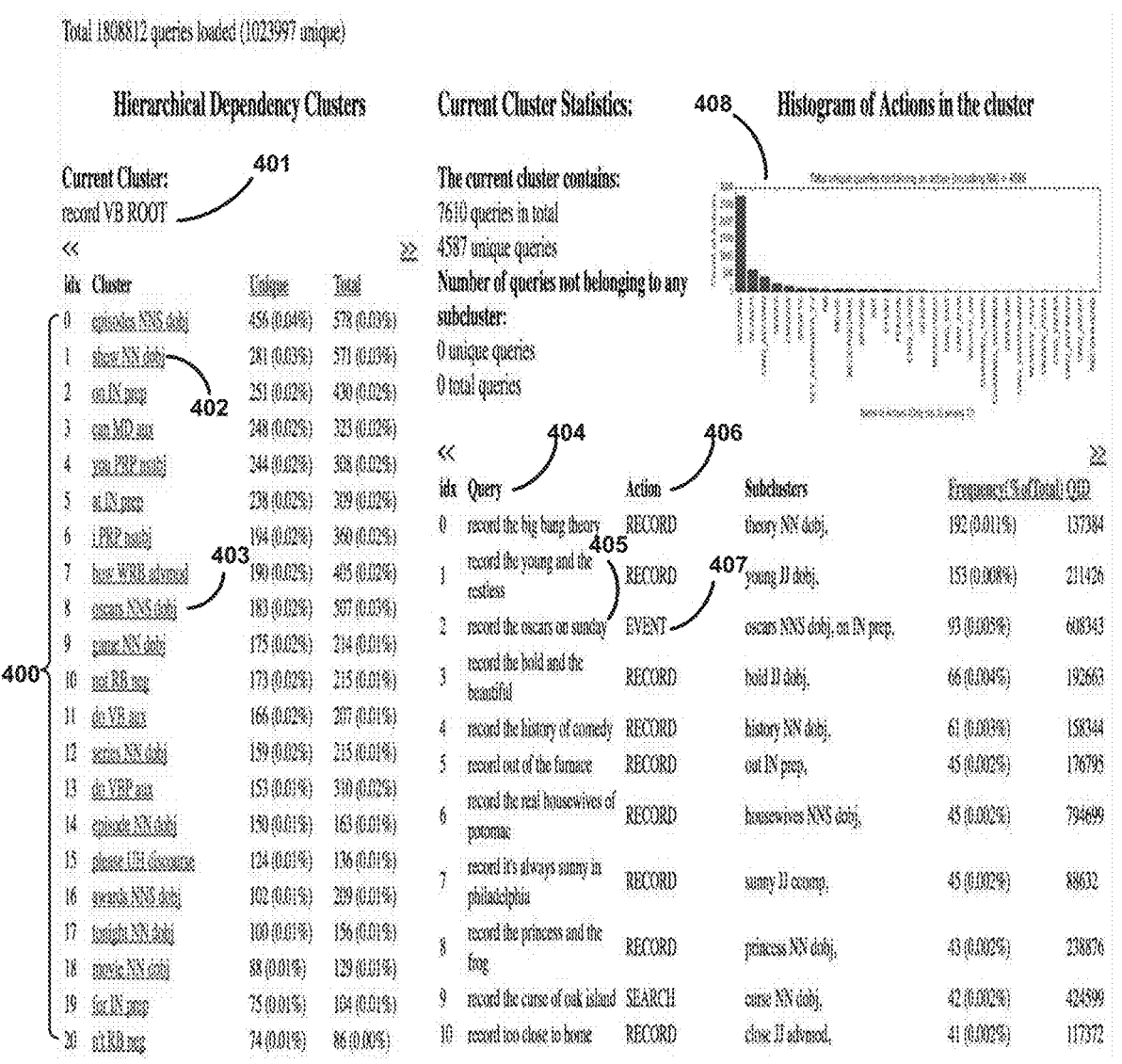
FIG. 4 is a diagram of a user interface.
Figure 5:
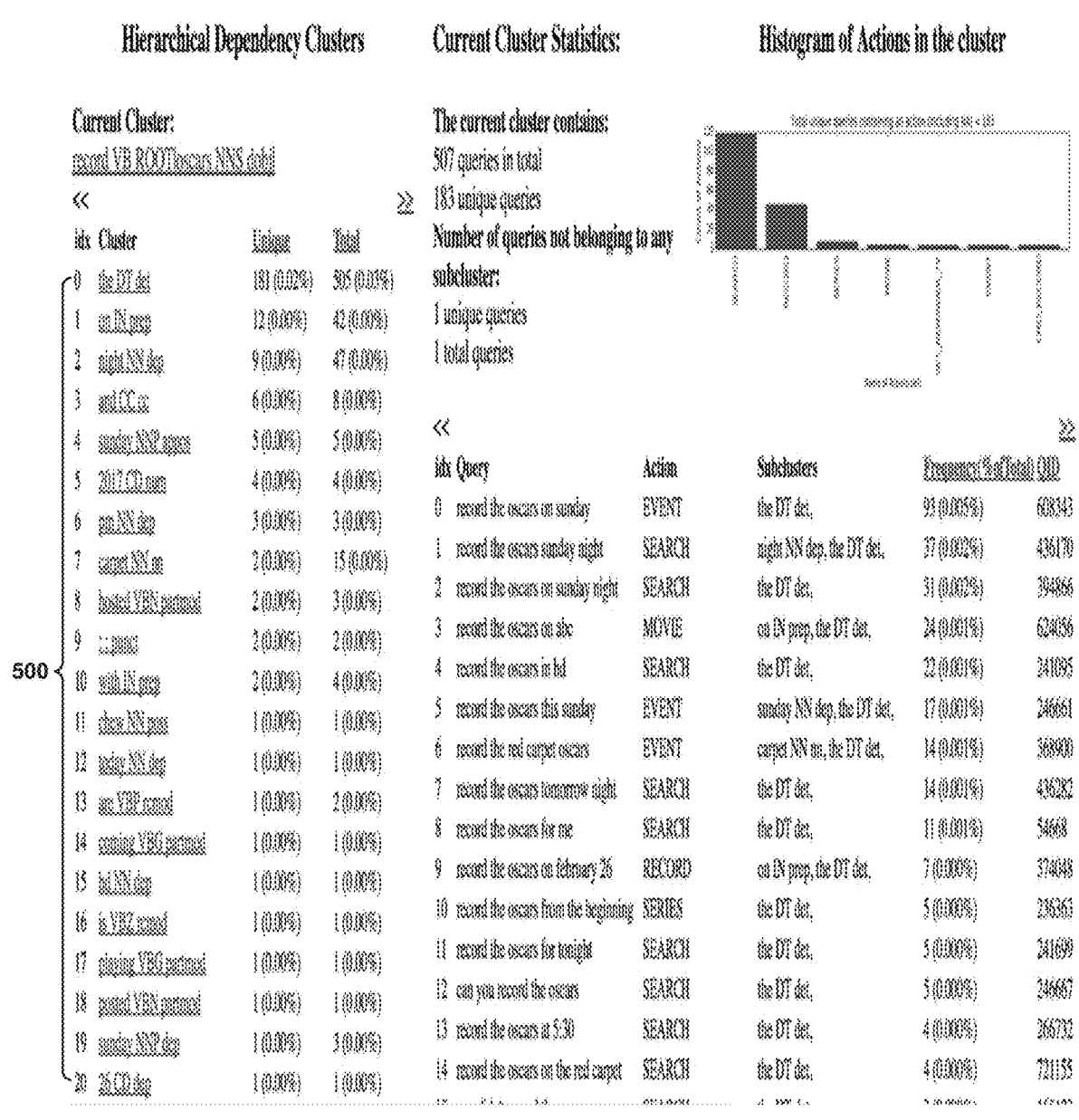
FIG. 5 is a diagram of a user interface.

FIG. 3, FIG. 4, and FIG. 5 are diagrams of an example user interface. The user interface shown in FIG. 3, FIG. 4, and FIG. 5 may be generated and/or provided to the voice enabled device (e.g., voice enabled device 100). Turning to FIG. 3, a plurality of dependency tree clusters 300 are shown. Each dependency tree duster of the plurality of dependency tree clusters 300 are indicated by idx 0 to idx 20. Each dependency tree cluster of the plurality of dependency tree clusters 300 may be initially indexed based on a root word/phrase associated with the respective voice input, as indicated by 301. The user interface may display a total amount of queries 302 (e.g., voice inputs, natural language queries, etc.) processed by a voice enabled device (e.g. voice enabled device 100). The total number of queries may be a quantity of unique queries 303, Unique queries (e.g., voice inputs, natural language queries, etc. may be queries that the system (e.g., voice enabled device) has not processed before and/or has no related data stored for (e.g., stored in storage module 104, database 116). A user may access the user interface displaying the plurality of dependency tree clusters 300. A user may click/access the dependency tree clusters 304 to visualize/access additional information, such as dependency tree clusters, voice inputs, responses to voice inputs, and dependency tree structures associated with the dependency tree clusters 304. The dependency tree clusters 304 are based on voice inputs with the verb "record" as an associated root word/phrase. The dependency tree clusters 304 are tagged with the indicator (e.g., parser label) "VB root" to indicate that the dependency tree clusters' 304 associated dependency tree structures are based on voice inputs that may use of the term "record" as a verb in a sentence. Voice inputs such as "Record the Oscars on Sunday," or "Record the Big Bang Theory," may be included with the dependency tree clusters 304.

FIG. 4 is an example of a scenario where a dependency tree cluster 304 has been clicked/accessed. A click/access of the dependency tree clusters 304 may reveal a plurality of associated dependency tree clusters 400. A click/access of the dependency tree clusters 304 may be indicated at 401. The plurality of associated dependency tree clusters 400 may have dependency tree clusters (e.g., sub-dependency tree clusters) associated with the dependency tree clusters 400 based on additional words/phrased of a voice input other than the respective root word/phrase, such as "Record the Oscars on Sunday" or "Record the Big Bang Theory," may be associated based on the respective terms "Oscars" and "Big Bang Theory," which are both associated with televi- sion programs, shows, episodes, and the like. As such, a dependency tree cluster 402 may be associated with the dependency tree clusters 304 based on the term "show" being a noun (as indicated by an associated tag "NN"), and the dependency tree cluster 403 may be associated with the dependency tree clusters 304 based on the plural form of the noun, in this case the plural of "show" (as indicated by an associated tag "INNS"). Voice inputs (e.g., queries, etc.) associated with the dependency tree structures/clusters may be indicated by the column 404. The voice input "Record the Oscars on Sunday" may be indicated at 405. The voice input indicated at 405 may be mapped to an action. Actions mapped to and/or associated with a plurality of voice inputs that are associated with the dependency tree clusters 304 may be indicated by the column 406. The voice input "Record the Oscars on Sunday," indicated at 405, may be mapped to and/or associated with the action (e.g., intent) "Event" 407 which indicates that the "Oscars" is an event occurring on Sunday. Voice inputs may be mapped to and/or associated with any action (e.g., proper response, correct response, intent, operation, command, etc.). Information (e.g., statistical information, histogram) associated with the dependency tree clusters 304 may be indicated at 408. The statistical data 408 indicates a total amount of voice inputs (e.g., queries) associated with the dependency tree clusters 304 and associated actions (e.g., proper responses, correct responses, intents, operations, commands, etc.). Any infor- mation associated with dependency tree structures, depen- dency tree clusters, voice inputs, and/or associated actions (e.g., proper responses, correct responses, intents, opera- tions, commands, etc.) may be represented, displayed, and/ or provided by the user interface.

FIG. 5 is an example of a scenario where the additional dependency tree clusters 500 (e.g., sub-clusters) associated with the dependency tree cluster 403 (a sub-cluster of dependency tree clusters 304) are revealed. The additional dependency tree clusters 500 may be revealed by clicking/ accessing the dependency tree cluster 403. Clicking/access- ing the dependency tree cluster 403 may reveal similar information (e.g., voice inputs, sub-dependency clusters, actions, statistical information, etc.) as described for FIG. 4.

Figure 6:
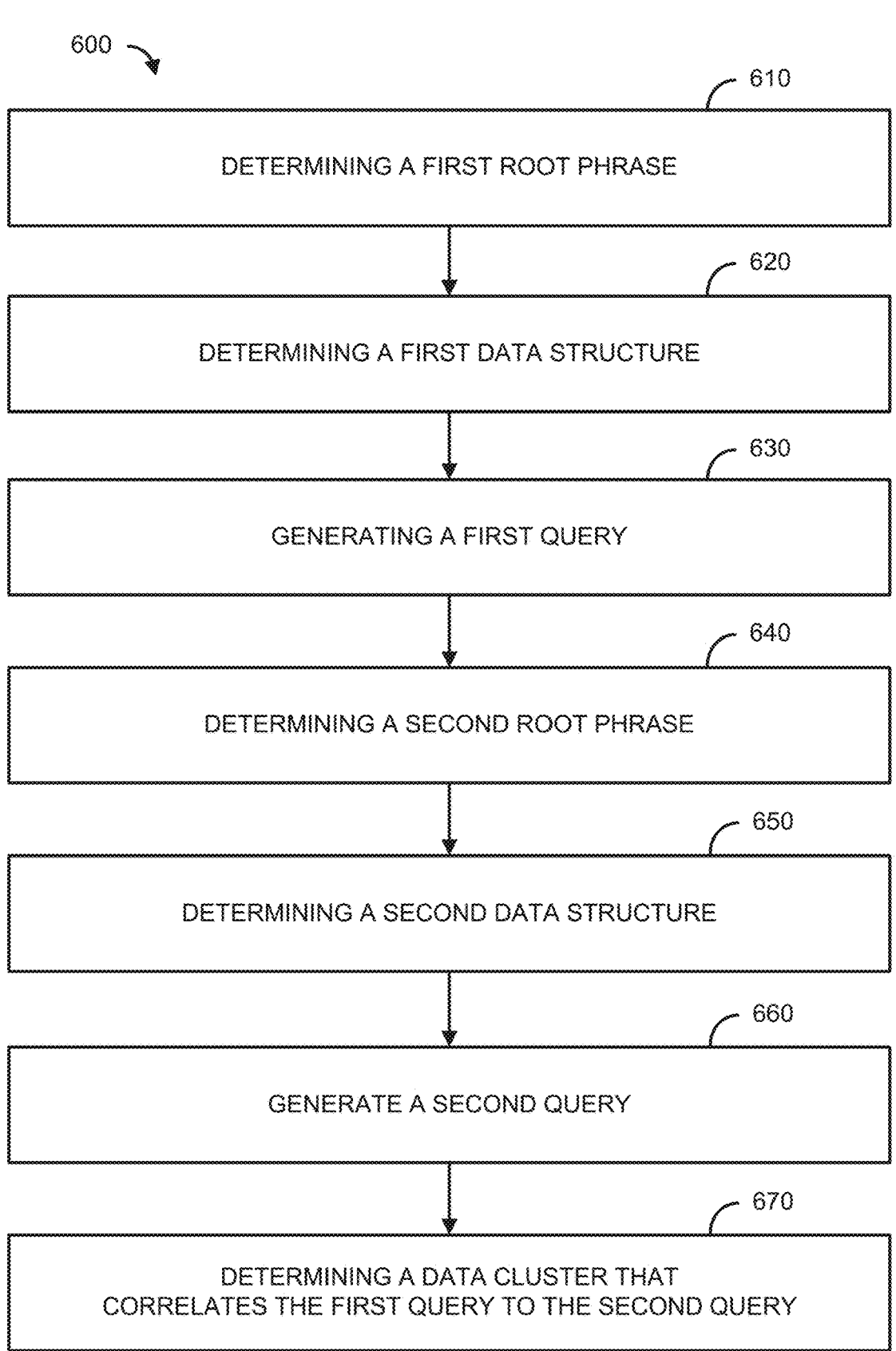
FIG. 6 is a flowchart of a method.

FIG. 6 is a flowchart of a method 600 for a visualization interface for voice input. At 610 a first voice input may be received. A voice enabled device (e.g., voice enabled device 100) may receive the first voice input. The voice enabled device may receive the first voice input via one or more microphones configured with the voice enabled device. The voice enabled device may receive the first voice input via a data transfer, a download, a content source, a network, and/or the like. The first voice input may be a request, command, query (e.g., natural language query, etc.), com- binations thereof, or the like. The first voice input may be "Show me a movie." The first voice input may be any type of request, command, query, or the like.

Also at 610, a first root word/phrase may be determined from the first voice input. The voice enabled device may determine the first root word/phrase from the first voice input. To determine the first root word/phrase from the first voice input, the voice enabled device may perform speech- to-text operations that translate the first voice input to text, a plurality of characters, and/or the like. The text, the plurality of characters, and/or the like may be mapped to and/or associated with information/data stored in storage (e.g., storage module 104, database 116, etc.). The voice enabled device may apply one or more speech/language recognition algorithms to the first voice input to determine the first root word/phrase. The voice enabled device may determine that the first root word/phrase of the first voice input, "Show me a movie," is "Show/show me."

At 620 a first syntactic tree (e.g., data structure, depen- dency tree structure, parse tree, dependency tree structure 200, etc.) may be determined/generated. The voice enabled device may determine/generate the first syntactic tree. The voice enabled device may determine/generate the first syn- tactic tree based on a syntactic properties and/or specific language-based rules. The syntactic properties and/or specific language-based rules may be stored in storage (e.g., storage module 104, database 116, etc.) and retrieved by the voice enabled device. The syntactic properties and/or specific language-based rules may be applied to the first voice input based on a top-down construction. A top-down construction instructs the first syntactic tree to be generated based on the first root word/phrase (e.g., "Show," "show me," etc.). Each additional word/phrase of the first voice input (e.g., "a movie," etc.) may be part of the first syntactic tree based on the syntactic properties and/or the specific language-based rules. As such, the first syntactic tree may be a first plurality of sub-phrases (e.g., "a movie," etc.). The first syntactic tree may be determined/generated by any suitable means/method. The first syntactic tree may have a plurality of tags (e.g., parser labels) that indicate and/or are associated with a portion of first voice input (e.g., parts of speech, etc.). The plurality of tags may include tags such as "NN" (e.g., noun), "VB" (e.g., verb), "JJ" (e.g., adjective), "RB" (adverb), combinations thereof, and the like. FIG. 2 provides an example of how the plurality of tags may be associated with a voice input, such as "Show me a movie."

At 630 a first query set may be generated. The voice enabled device may generate the first query set. The voice enabled device may generate the first query set based on the first root word/phrase and the first syntactic tree (e.g., data structure, dependency tree structure, parse tree, dependency tree structure 200, etc.). The first query set may be generated as a file, code, or the like that associates the first root word/phrase and the first syntactic tree. The voice enabled device may store the first query set in storage (e.g., storage module 104, database 116, etc.). The first query set may be associated with an identifier (e.g., first identifier). The identifier may be used as an indicator and/or classifier of the first query set. The voice enabled device may use the identifier to access, retrieve, and/or display the first query set. The first query set may have and/or be associated with a plurality of nodes. Each node of the plurality of nodes may be associated with a portion of the first voice input (e.g., part of speech, etc.). Each node of the plurality of nodes may be associated with a tag of the plurality of tags. Each node of the plurality of nodes may be associated with any type of additional information (e.g., statistical information, language-based information, etc.).

At 640 a second voice input may be received. The voice enabled device (e.g., voice enabled device 100) may receive the second voice input. The voice enabled device may receive the second voice input via one or more microphones configured with the voice enabled device. The voice enabled device may receive the second voice input via a data transfer, a download, a content source, a network, and/or the like. The second voice input may be a request, command, query (e.g., natural language query, etc.), combinations thereof, or the like. The second voice input may be "I want to watch a movie." The second voice input may be any type of request, command, query, or the like.

Also at 640, a second root word/phrase may be determined from the second voice input. The voice enabled device may determine the second root word/phrase from the second voice input. To determine the second root word/phrase from the second voice input, the voice enabled device may perform speech-to-text operations that translate the second voice input to text, a plurality of characters, and/or the like. The text, the plurality of characters, and/or the like may be mapped to and/or associated with information/data stored in storage (e.g., storage module 104, database 116, etc.). The voice enabled device may apply one or more speech/language recognition algorithms to the second voice input to determine the second root word/phrase. The voice enabled device may determine that the second root word/phrase of the second voice input, "I want to watch a movie," is "1 want."

At 650 a second syntactic tree (e.g., data structure, dependency tree structure, parse tree, dependency tree structure 200, etc.) may be determined/generated. The voice enabled device may determine/generate the second syntactic tree. The voice enabled device may determine/generate the second syntactic tree based on syntactic properties and/or specific language-based rules. The syntactic properties and/or the specific language-based rules may be stored in storage (e.g., storage module 104, database 116, etc.) and retrieved by the voice enabled device. The syntactic properties and/or specific language-based rules may be applied to the second voice input based on a top-down construction. A top-down construction instructs the second syntactic tree to be generated based on the second root word/phrase (e.g., "I want," etc.). Each additional word/phrase of the second voice input (e.g., "to watch a movie," etc.) may be part of the second syntactic tree based on the syntactic properties and/or the specific language-based rules. As such, the second syntactic tree may have a second plurality of sub-phrases (e.g., "to watch," "a movie," etc.). The second syntactic tree may be determined/generated by any suitable means/method. The second syntactic tree may comprise a plurality of tags (e.g., parser labels) that indicate and/or are associated with a portion of second voice input (e.g., parts of speech, etc.). The plurality of tags may include tags such as "NN" (e.g., noun), "VB" (e.g., verb), "JJ" (e.g., adjective), "RB" (adverb), combinations thereof, and the like.

At 660 a second query set may be generated. The voice enabled device may generate the second query set. The voice enabled device may generate the second query set based on the second root word/phrase and the second syntactic tree (e.g., data structure, dependency tree structure, parse tree, dependency tree structure 200, etc.). The second query set may be generated as a file, code, or the like that associates the second root word/phrase and the second syntactic tree. The voice enabled device may store the second query set in storage (e.g., storage module 104, database 116, etc.). The second query set may be associated with an identifier (e.g., first identifier). The identifier may be used as an indicator and/or classifier of the second query set. The voice enabled device may use the identifier to access, retrieve, and/or display the second query set. The second query set may have and/or be associated with a plurality of nodes. Each node of the plurality of nodes may be associated with a portion of the second voice input (e.g., part of speech, etc.). Each node of the plurality of nodes may be associated with a tag of the plurality of tags. Each node of the plurality of nodes may be associated with any type of additional information (e.g., statistical information, language-based information, etc.).

At 670 a cluster set (e.g., dependency tree cluster, data clusters, etc.) may be determined. The voice enabled device may determine the cluster set. The voice enabled device may determine the cluster set based on at least a portion of the first query set and at least a portion of the second query set. The voice enabled device may determine the cluster set by associating/matching at least a portion of the first query set to at least a portion of the second query set. At least a portion of the first query set may be associated/matched with at least a portion of the second query set based on the first root word/phrase and the first root word/phrase. The voice enabled device may determine that "Show me" and "I want" are word/phrases that share a relationship. The voice enabled device may determine that associations/matches between the first query set and the second query set satisfy a threshold.

The voice enabled device may determine that the phrases "a movie" and "to watch a movie" have similar words/phrases that satisfy a threshold of two common words/phrases (e.g., "a" and "movie"). The first query set and the second query set may be associated/matched (e.g., grouped) based on any relationship, property, or the like.

The cluster set may be displayed. The voice enabled device may display and/or cause display of the cluster set. The voice enabled device may generate an interface (e.g., graphical user interface, user interface, interface module 109, etc.). The cluster set may be displayed in a manner that maps a first voice input to response information (e.g., a proper response, an action, a correct response, an intent, an operation, a command, etc.) associated with the first voice input. The cluster set may be displayed in a manner that maps a second voice input to response information (e.g., a proper response, an action, a correct response, an intent, an operation, a command, etc.) associated with the second voice input. The voice enabled device may map at least a portion of the first voice input (e.g., "movie," etc.) to predefined information (e.g., information stored in storage module 104, database 116, etc.). The voice enabled device may map at least a portion of the second voice input (e.g., "movie," etc.) to predefined information (e.g., information stored in storage module 104, database 116, etc.). To map voice inputs to predefined information, the voice enabled device may identify/retrieve/associate stored templates (e.g., stored in storage module 104, database 116, etc.) that associate words and/or phrases to a corpus of information (e.g., deep learning responses, machine-learned responses, predefined answers, information provided by one or more content sources, etc.).

Cluster sets that map voice inputs to response information may be used to generate/create a corpus of information (e.g., deep learning responses, machine-learned responses, predefined answers, etc.). The corpus of information may be retained in storage (e.g., the storage module 104, the database 116, etc.). The corpus of information may be used to train and/or update a neural network to provide/predict responses to voice inputs. The corpus of information may be used to train (e.g., via machine learning, etc.) a device, such as a server, cloud-based device, computing device, or the like, to provide/predict responses to voice inputs via an iterative learning process. The iterative learning process may reduce an amount of time required to process voice inputs (e.g., map voice inputs to responses, etc.) for voice inputs that are routine, common, and/or of repeat occurrence. A processing time (e.g., time required to associate a voice input with a response, etc.) associated with voice inputs that begin with (e.g., a root word/phrase, etc.) and/or include, "show me," such as, "show me a movie," "show me an action movie," "show me a television show," and the like, may be reduced because the voice enabled device may already have cluster sets that predicts/associates at least a portion of the voice input to a response (e.g., predefined information, etc.). The iterative learning process and/or the ability of the voice enabled device to provide/predict responses to voice inputs may be used in a variety of technologies and applications, such as artificial intelligence (AI).

Figure 7:
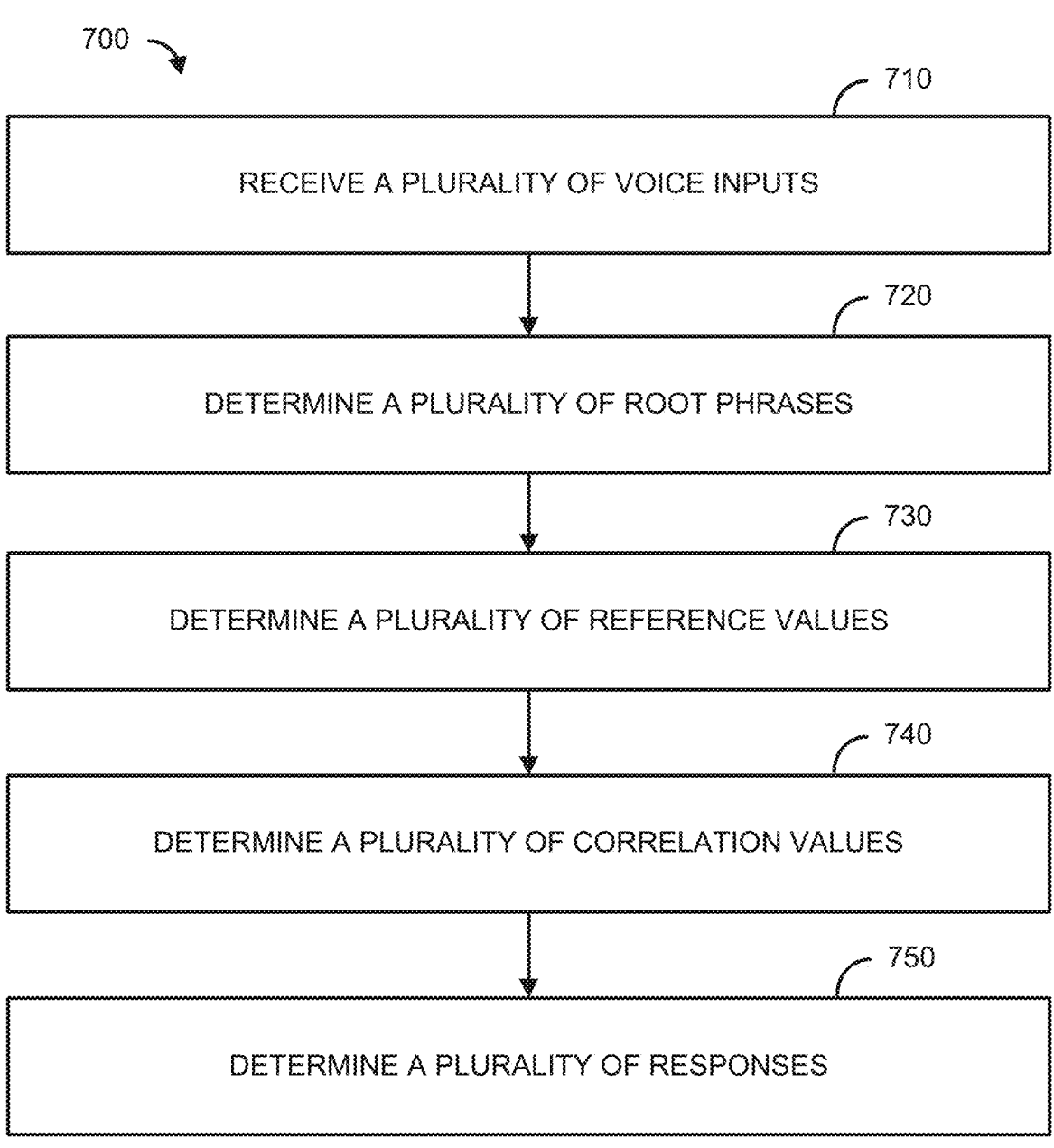
FIG. 7 is a flowchart of a method.

FIG. 7 is a flowchart of a method 700 for a visualization interface for voice input. At 710 a plurality of voice inputs may be received. A voice enabled device (e.g., voice enabled device 100) may receive the plurality of voice inputs. The voice enabled device may receive the plurality of voice inputs via one or more microphones configured with the voice enabled device. The voice enabled device may receive the plurality of voice inputs via a data transfer, a download, a content source, a network, and/or the like. The plurality of voice inputs may be requests, commands, queries (e.g., natural language queries, etc.), combinations thereof, or the like. A voice input may be "Show me a movie." The plurality of voice inputs may be any type of requests, commands, queries, or the like.

At 720, a plurality of root words/phrases may be determined from the plurality of voice inputs. The voice enabled device may determine the plurality of root words/phrases from the plurality of voice inputs. To determine the plurality of root words/phrases from the plurality of voice inputs, the voice enabled device may perform speech-to-text operations that translate the each voice input of the plurality of voice inputs to text, a plurality of characters, and/or the like. The text, the plurality of characters, and/or the like may be mapped to and/or associated with information/data stored in storage (e.g., storage module 104, database 116, etc.). The voice enabled device may apply one or more speech/language recognition algorithms to each voice input of the plurality of voice inputs to determine the plurality of root words/phrases. The voice enabled device may determine that a root word/phrase of the voice input, "Show me a movie," is "Show/show me."

At 730 a reference value (e.g., integer value, etc.) may be determined for (associated with) each root word/phrase of the plurality of root words/phrases. The voice enabled device may determine, for each root word/phrase of the plurality of root word/phrases, a reference value of a plurality of reference values. The voice enabled device may determine the integer values based on term frequency-inverse document frequency (TFIDF). The voice enabled device may use TDIDF to determine a reference value (e.g., integer value, statistical value, numerical value, etc.) that reflects a number of times a root word/phrase appears (e.g., a frequency of occurrence) within stored information/data (e.g., a corpus of information/data associated with voice inputs, information/data stored in storage module 104, information/data stored in database 116, etc.). The voice enabled device may use any logic when determining reference values to associated with root words/phrases. A root word/phrase may be assigned any reference value.

At 740 a correlation value of a plurality of correlation values may be determined. The voice enabled device may determine a correlation value of a plurality of correlation values for each response of a plurality of responses. A root word/phrase associated with a voice input "show me," as in "show me a movie," and may be assigned an integer value of ten (10). A response may be stored in storage for a query with a root word/phrase "I want," as in "I want to watch a movie." "I want," may be conceptually nearer in integer value to "show me," than a response stored in storage for a query with a root word/phrase "what time," as in "what time does Game of Thrones come on'?" The root word/phrase "I want" may be assigned a correlation value of nine (9). The root word/phrase "what time" and may be assigned a correlation value of seven (7). The voice enabled device may use any logic when assigning correlation values to responses. A response may be assigned any correlation value.

At 750 an association between each voice input of the plurality of voice inputs and a response of a plurality of responses may be determined. The voice enabled device may determine the association between each voice input of the plurality of voice inputs and a response of the plurality of responses. The voice enabled device may determine the association between each voice input of the plurality of voice inputs and a response of the plurality of responses based on a difference between a respective reference value associated with a respective root word/phrase of the voice input and a correlation value associated with a response of the plurality of responses. Differences between a reference value of ten (10) associated with a voice input with a root word/phrase "show me," (e.g., as in "show me a movie") and a correlation value of nine (9) associated with a stored query/response with a root word/phrase "I want," (e.g., as in "I want to watch a movie") may yield a smaller value (e.g., 10−9=1) than a difference between the reference value for "show me" (e.g., as in "show me a movie") and a correlation value of seven (7) associated with a stored query/response with a root word/phrase "what time," (e.g., as in "what time does Game of Thrones come on?). Specifically, the difference between ten (10) and nine (9) is one (1) while the difference ten (10) and seven (7) is three (3) (e.g., 1<3). The voice enabled device may determine the association between each voice input of the plurality of voice inputs and a response of a plurality of responses based on a threshold. The voice enabled device may associate voice inputs of the plurality of voice inputs and responses of the plurality of responses that have a difference between the respective reference values and correlation values that is less than a threshold (e.g., less than a specific value, less than 2, etc.).

The voice enabled device may determine any number of associations between any number of voice inputs and any number of responses. In the manner described for determining responses to voice inputs (or a similar manner) the voice enabled device may be used to train a neural network to predict and/or identify proper responses (e.g., actions, correct responses, intents, operations, commands, etc.) to voice inputs.

An association between a voice input and a response may enable the voice enabled device to provide the response to a user providing the voice input. The voice enabled device, based on an association between a voice input and a response, may retrieve and/or access the response and/or information associated with the response. The voice enabled device may provide information, convert/map the response, and/or information associated with the response to acoustic information (e.g., map a text file, file, or the like associated with the response to an acoustic file, etc.). The voice enabled device may provide the acoustic information to the user. The voice enabled device may provide the acoustic information (e.g., converted response and/or information associated with the response, etc.) to the user via one or more speakers (e.g., speakers configured with the voice input module 101, etc.)

An association between a voice input and a response may enable the voice enabled device to execute one of more actions associated with the response, A the voice enabled device may associate a voice input, "Turn to Game of Thrones," with a response/intent. The response/intent may be associated with one or more commands, controls, files, or the like. The association between the voice input and the response/intent may cause the voice enabled device (or a device associated device) to access a file, access a channel, request a file, request a channel, or the like.

Figure 8:
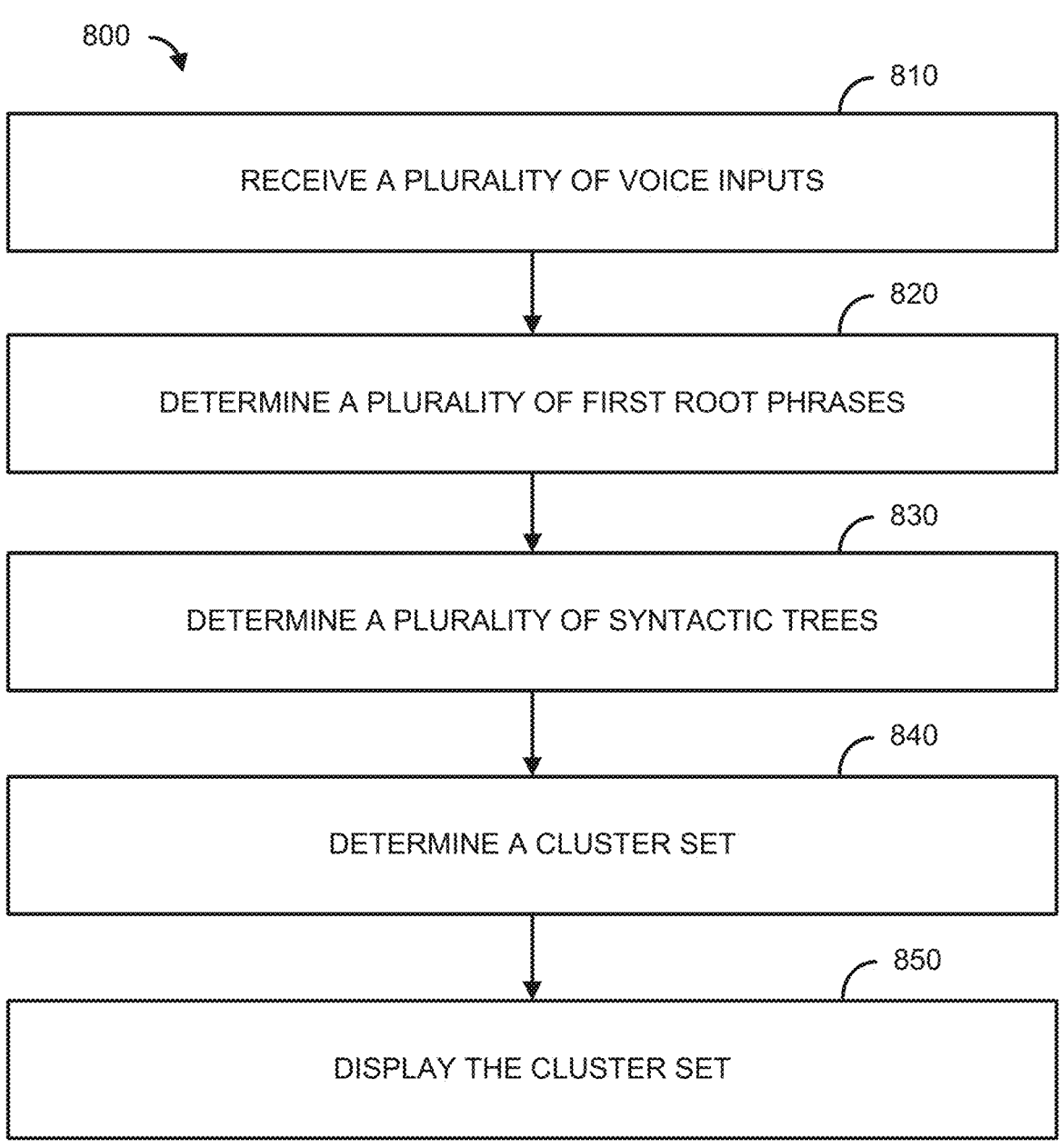
FIG. 8 is a flowchart of a method.

FIG. 8 is a flowchart of a method 800 for a visualization interface for voice input. At 810 a plurality of voice inputs may be received. A voice enabled device (e.g., voice enabled device 100) may receive the plurality of voice inputs. The voice enabled device may receive the plurality of voice inputs via one or more microphones configured with the voice enabled device. The voice enabled device may receive the plurality of voice inputs via a data transfer, a download, a content source, a network, and/or the like. The plurality of voice inputs may be requests, commands, queries (e.g., natural language queries, etc.), combinations thereof, or the like. A voice input may be "Show me a movie." The plurality of voice inputs may be any type of requests, commands, queries, or the like.

At 820, a plurality of root words/phrases may be determined from the plurality of voice inputs. The voice enabled device may determine the plurality of root words/phrases from the plurality of voice inputs. To determine the plurality of root words/phrases from the plurality of voice inputs, the voice enabled device may perform speech-to-text operations that translate the each voice input of the plurality of voice inputs to text, a plurality of characters, and/or the like. The text, the plurality of characters, and/or the like may be mapped to and/or associated with information/data stored in storage (e.g., storage module 104, database 116, etc.). The voice enabled device may apply one or more speech/language recognition algorithms to each voice input of the plurality of voice inputs to determine the plurality of root words/phrases. The voice enabled device may determine that a root word/phrase of the voice input, "Show me a movie," is "Show/show me."

At 830 a plurality of syntactic trees (e.g., data structures, dependency tree structures, parse trees, dependency tree structure 200, query sets, etc.) may be determined/generated. The voice enabled device may determine/generate the plurality of syntactic trees. The voice enabled device may determine/generate the plurality of syntactic trees based on syntactic properties and/or specific language-based rules. The syntactic properties and/or the specific language-based rules may be stored in storage (e.g., storage module 104, database 116, etc.) and retrieved by the voice enabled device. The syntactic properties and/or specific language-based rules may be applied to each voice input of the plurality of voice inputs based on a top-down construction. A top-down construction instructs the each syntactic tree of the plurality of syntactic trees to be generated based on a respective root word/phrase of the plurality of root words/phrases (e.g., "Show," "show me," etc.). Each additional word/phrase of the first voice input (e.g., "a movie," etc.) may be part of the first syntactic tree based on the syntactic properties and/or the specific language-based rules. As such, each syntactic tree of the plurality of syntactic trees may be a plurality of sub-phrases (e.g., "a movie," etc.). The plurality of syntactic trees may be determined/generated by any suitable means/method. Each syntactic tree of the plurality of syntactic trees may have a plurality of tags (e.g., parser labels) that indicate and/or are associated with a portion of a respective voice input of the plurality of voice inputs (e.g., parts of speech, etc.). The plurality of tags may include tags such as "NN" (e.g., noun), "VB" (e.g., verb), "JJ" (e.g., adjective), "RB" (adverb), combinations thereof, and the like. FIG. 2 provides an example of how the plurality of tags may be associated with a voice input, "Show me a movie."

At 840 a cluster set may be determined. The voice enabled device may determine the cluster set. The voice enabled device may determine, for at least a portion of the plurality of syntactic trees (e.g., data structures, dependency tree structures, parse trees, dependency tree structure 200, etc.), a match between a quantity of phrases associated with the respective voice input satisfies a threshold. The voice enabled device may determine voice inputs "Show me a movie" and "I want to watch a movie" have similar root words/phrases (e.g., "Show me" and "I want"). The similarity in the root words/phrases may be based on any property of the words/phrases, such as a definition or intent. The voice enabled device may determine voice inputs "Show me a movie" and "I want to watch a movie" have similar words/phrases (e.g., "a movie" and "to watch a movie") that satisfy a threshold of two common words/phrases (e.g., "a" and "movie"). Syntactic trees (e.g., data structures, dependency tree structures, parse trees, the dependency tree structure 200, etc.) may be associated/matched (e.g., grouped) based on any relationship, property, or the like. The cluster set may be stored in storage (e.g., storage module 104, database 116, etc.).

At 850 the cluster set may be displayed. The voice enabled device may cause display of and/or display the cluster set. The voice enabled device may generate an interface (e.g., graphical user interface, user interface, interface module 109, etc.). The cluster set may be displayed in a manner that maps each voice input of the plurality of voice inputs to response information (e.g., a proper response, an action, a correct response, an intent, an operation, a command, etc.) associated with the respective voice input. The voice enabled device may map at least a portion of each voice input of the plurality of voice inputs (e.g., "movie," etc.) to predefined information (e.g., information stored in storage module 104, database 116, etc.). To map each voice input of the plurality of voice inputs to predefined information, the voice enabled device may identify/retrieve/associate stored templates (e.g., stored in storage module 104, database 116, etc.) that associate words and/or phrases to a corpus of information (e.g., deep learning responses, machine-learned responses, predefined answers, information provided by one or more content sources, etc.

Cluster sets (e.g., data clusters, etc.) that map voice inputs to predefined information (e.g., one or more responses, etc.) may be used to generate/create a corpus of information (e.g., deep learning responses, machine-learned responses, predefined answers, etc.). The corpus of information may be retained in storage (e.g., the storage module 104, the database 116, etc.). The corpus of information may be used to train and/or update a neural network to provide/predict responses to voice inputs. The corpus of information may be used to train (e.g., via machine learning, etc.) a device, such as a server, cloud-based device, computing device, or the like, to provide/predict responses to voice inputs via an iterative learning process. The ability of the device to provide/predict responses to voice inputs may he used in a variety of technologies and applications, such as artificial intelligence (AI).

Figure 9:
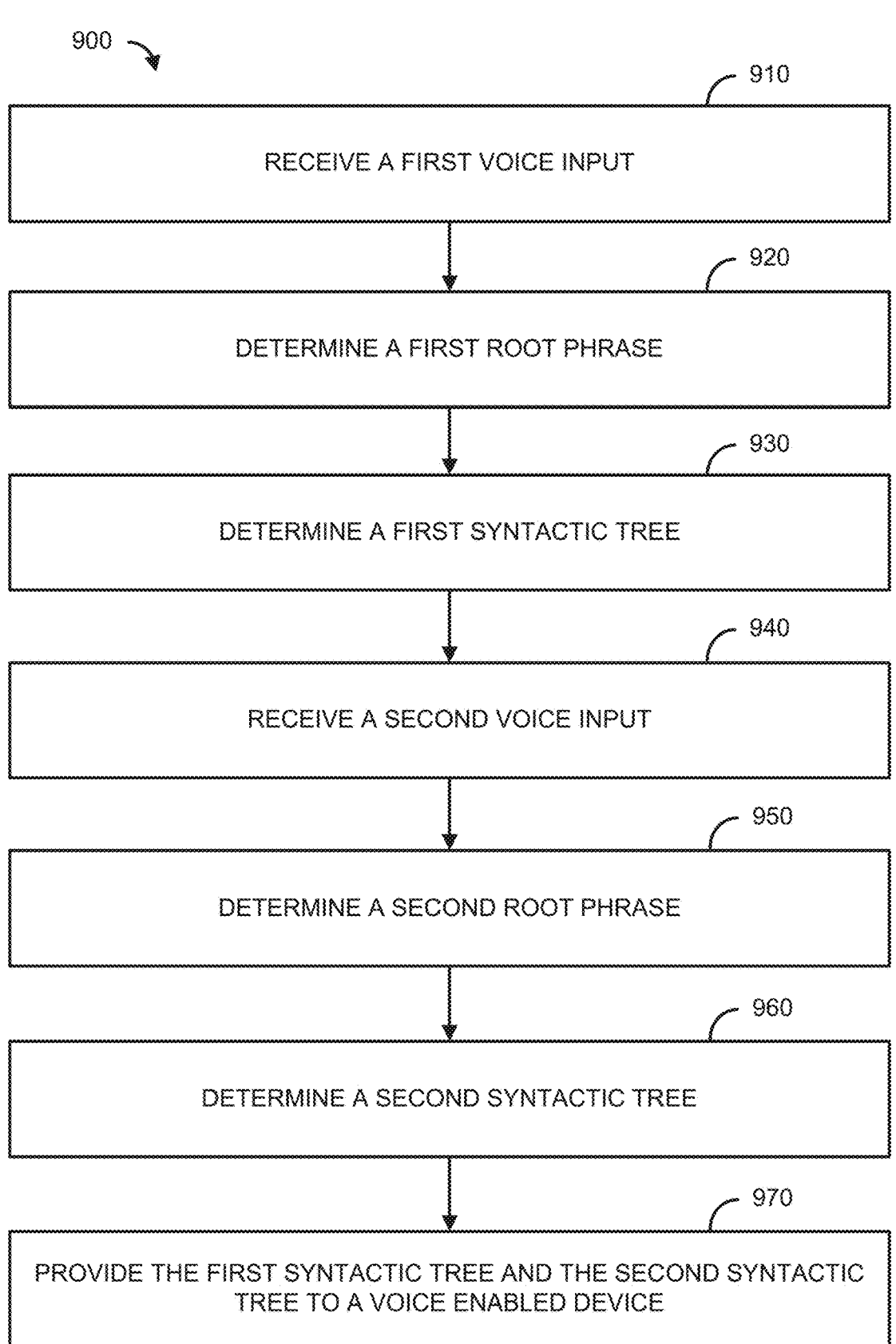
FIG. 9 is a flowchart of a method.

FIG. 9 is a flowchart of a method for a visualization interface for voice input. At 910 a computing device (e.g., computing device 106, etc.) may receive a first voice input. The computing device may receive the first voice input from a voice enabled device. The first voice input may be a voice input that the voice enabled device received via one or more microphones configured with the voice enabled device. The voice enabled device may receive the first voice input via a data transfer, a download, a content source, a network, and/or the like. The first voice input may be a request, command, query (e.g., natural language query, etc.), combinations thereof, or the like. The first voice input may be "Show me a movie." The first voice input may be any type of request, command, query, or the like.

At 920 a first root word/phrase may be determined. The computing device may determine the first word/root phrase. The computing device may determine the first root word/phrase based on the first voice input. To determine the first root word/phrase from the first voice input, the computing device may perform speech-to-text operations that translate the first voice input to text, a plurality of characters, and/or the like. The text, the plurality of characters, and/or the like may be mapped to and/or associated with information/data stored in storage (e.g., database 116, storage module 104, etc.). The computing device may apply one or more speech/language recognition algorithms to the first voice input to determine the first root word/phrase. The computing device may determine that the first root word/phrase of the first voice input, "Show me a movie," is "Show/show me."

At 930 a first syntactic tree (e.g., data structure, dependency tree structure, parse tree, dependency tree structure 200, etc.) may be determined/generated. The computing device may determine/generate the first syntactic based on a syntactic properties and/or specific language-based rules. The syntactic properties and/or the specific language-based rules may be stored in storage (e.g., database 116, storage module 104, etc.) and retrieved by the computing device. The syntactic properties and/or specific language-based rules may be applied to the first voice input based on a top-down construction. A top-down construction instructs the first syntactic tree to be generated based on the first root word/phrase (e.g., "Show," "show me," etc.). Each additional word/phrase of the first voice input (e.g., "a movie," etc.) may be part of the first syntactic tree based on the syntactic properties and/or the specific language-based rules. As such, the first syntactic tree may have a first plurality of sub-phrases (e.g., "a movie," etc.). The first syntactic tree may be determined/generated by any suitable means/method. The first syntactic tree may have a plurality of tags (e.g., parser labels) that indicate and/or are associated with a portion of first voice input (e.g., parts of speech, etc.). The plurality of tags may include tags such as "NN" (e.g., noun), "VB" (e.g., verb), "JJ" (e.g., adjective), "RB" (adverb), combinations thereof, and the like. FIG. 2 provides an example of how the plurality of tags may be associated with a voice input, "Show me a movie."

At 940 the computing device may receive a second voice input. The computing device may receive the second voice input from the voice enabled device. The second voice input may be a voice input that the voice enabled device receives via one or more microphones configured with the voice enabled device. The voice enabled device may receive the second voice input via a data transfer, a download, a content source, a network, and/or the like. The second voice input may be a request, command, query (e.g., natural language query, etc.), combinations thereof, or the like. The second voice input may be "I want to watch a movie." The second voice input may be any type of request, command, query, or the like.

At 950 a second root word/phrase may be determined. The computing device may determine the second word/root phrase. The computing device may determine the second root word/phrase based on the second voice input. To determine the second root word/phrase from the second voice input, the computing device may perform speech-to-text operations that translate the second voice input to text, a plurality of characters, and/or the like. The text, the plurality of characters, and/or the like may be mapped to and/or associated with information/data stored in storage (e.g., database 116, storage module 104, etc.). The computing device may apply one or more speech/language recognition algorithms to the second voice input to determine the second root word/phrase. The computing device may determine that the second root word/phrase of the first voice input, "I want to watch a movie," is "I want."

At 960 a second syntactic tree (e.g., data structure, dependency tree structure, parse tree, dependency tree structure 200, etc.) may be determined/generated. The computing device may determine/generate the second syntactic based on a syntactic properties and/or specific language-based rules. The syntactic properties and/or the specific language-based rules may be stored in storage (e.g., database 116, storage module 104, etc.) and retrieved by the computing device. The syntactic properties and/or specific language-based rules may be applied to the second voice input based on a top-down construction. A top-down construction instructs the second syntactic tree to be generated based on the second root word/phrase (e.g., "Show," "show me," etc.). Each additional word/phrase of the second voice input (e.g., "a movie," etc.) may be part of the second syntactic tree based on the syntactic properties and/or the specific language-based rules. As such, the second syntactic tree may have a second plurality of sub-phrases (e.g., "to watch," "a movie," etc.). The second syntactic tree may be determined/generated by any suitable means/method. The second syntactic tree may have a plurality of tags (e.g., parser labels) that indicate and/or are associated with a portion of second voice input (e.g., parts of speech, etc.). The plurality of tags may include tags such as "NN" (e.g., noun), "VB" (e.g., verb), "JJ" (e.g., adjective), "RB" (adverb), combinations thereof, and the like.

At 970 the first syntactic tree and the second syntactic tree may be provided/sent to the voice enabled device. The computing device may provide/send the first syntactic tree and the second syntactic tree to the voice enabled device. The computing device may provide/send the first syntactic tree and the second syntactic tree to the voice enabled device via a communication session (e.g., long-range communication session, short-range communication session, application programming interface (API), etc.).

The voice enabled device may determine a response to the first voice input and/or the second voice input. The voice enabled device may determine a response to the first voice input and/or the second voice input based on the first syntactic tree and the second syntactic tree, respectively. The voice enabled device may determine respective vectors (e.g., resultant vectors, etc.) associated with the first voice input and the second voice input. The voice enabled device may convert/translate the first syntactic tree to a first vector. Every part of speech (e.g., phrase, sub-phrase, etc.) of the first voice input and an associated portion of a first syntactic tree may be represented by a vector of a plurality of vectors. Each part of speech (e.g., phrase, sub-phrase, etc.) of the first voice input and the associated portion of the first syntactic tree may be a dimension of the first voice input and the associated portion of the first syntactic tree. The first voice input and the first syntactic tree may have any number of dimensions (e.g., n-dimensions, any number of portions, any number of branches, any number of sub-dependency trees, etc.) based on a root word/phrase. The first syntactic tree may have a root word/phrase such as "Show/Show me," which may be represented by a vector. Every other part of speech (e.g., every portion of the dependency tree structure, sub-dependency tree, etc.) of the first voice input (e.g., sub-phrase, "a," "movie," etc.) may also be represented by a vector. Each dimension may correspond to a part of speech associated with the first voice input and/or portion of the first syntactic tree. Each vector associated with a first voice input/first syntactic tree may be added (e.g., element-wise) and/or averaged to generate/create the first vector (e.g., resultant vector). The second vector may be generated/created, based on the second voice input and/or the second syntactic tree, in the same manner described for generating/creating the first vector. The first vector and/or the second vector may be normalized to fixed vector lengths. Normalization may be performed using any of a variety of well-known and established techniques.

To determine a response associated with the first voice input and/or second voice input, the voice enabled device may perform a dot-product operation between the first vector and a vector associated with a response, and a dot-product operation between the second vector and the vector associated with the response. The response and/or the vector associated with the response may be retrieved/accessed from storage (e.g., the storage module 104, the database 116, etc.) comprising a corpus of information (e.g., deep learning responses, machine-learned responses, predefined answers, information provided by one or more content sources, etc.). The dot-product operation between the first vector and the vector associated with the response, and the dot-product operation between the second vector and the vector associated with the response may yield a first value and second value, respectively.

The voice enabled device may determine that the first value and/or the second value either does not satisfy a relevancy threshold, satisfy the relevancy threshold, or exceed the relevancy threshold. The relevancy threshold may be associated with the response. The relevancy threshold may be a integer value associated with the response. The voice enabled device may determine that the first voice input is associated with the response because the first value satisfies relevancy threshold. The integer value associated with the relevancy threshold may be four (4) and the first value may be four (4). The voice enabled device may determine that the first voice input is associated with the response because the first value is equal to or exceeds the integer value associated with the response (e.g., 4>4). The voice enabled device may determine that the second voice input is not associated with the response because the second value does not satisfy a relevancy threshold. The integer value associated with the relevancy threshold may be four (4) and the second value may be three (3). The voice enabled device may determine that the second voice input is not associated with the response because the second value is less than the integer value associated with the response (e.g., 3<4). Any integer value may be associated with any response. Integer values associated with responses may be determined based on a frequency of occurrence (e.g., how often a response is associated with a voice input), assigned integer values (e.g., integer values assigned via a mathematical/logic-based algorithm, etc.), or any other method.

The voice enabled device, by associating voice inputs with responses, may generate/create a corpus of information (e.g., deep learning responses, machine-learned responses, predefined answers, etc.). The corpus of information may be retained in storage (e.g., the storage module 104, the database 116, etc.). The corpus of information may be used to train and/or update a neural network to provide/predict responses to voice inputs. The corpus of information may be used to train (e.g., machine learning, etc.) a device, such as a server, cloud-based device, computing device, or the like, to provide/predict responses to voice inputs.

Figure 10:
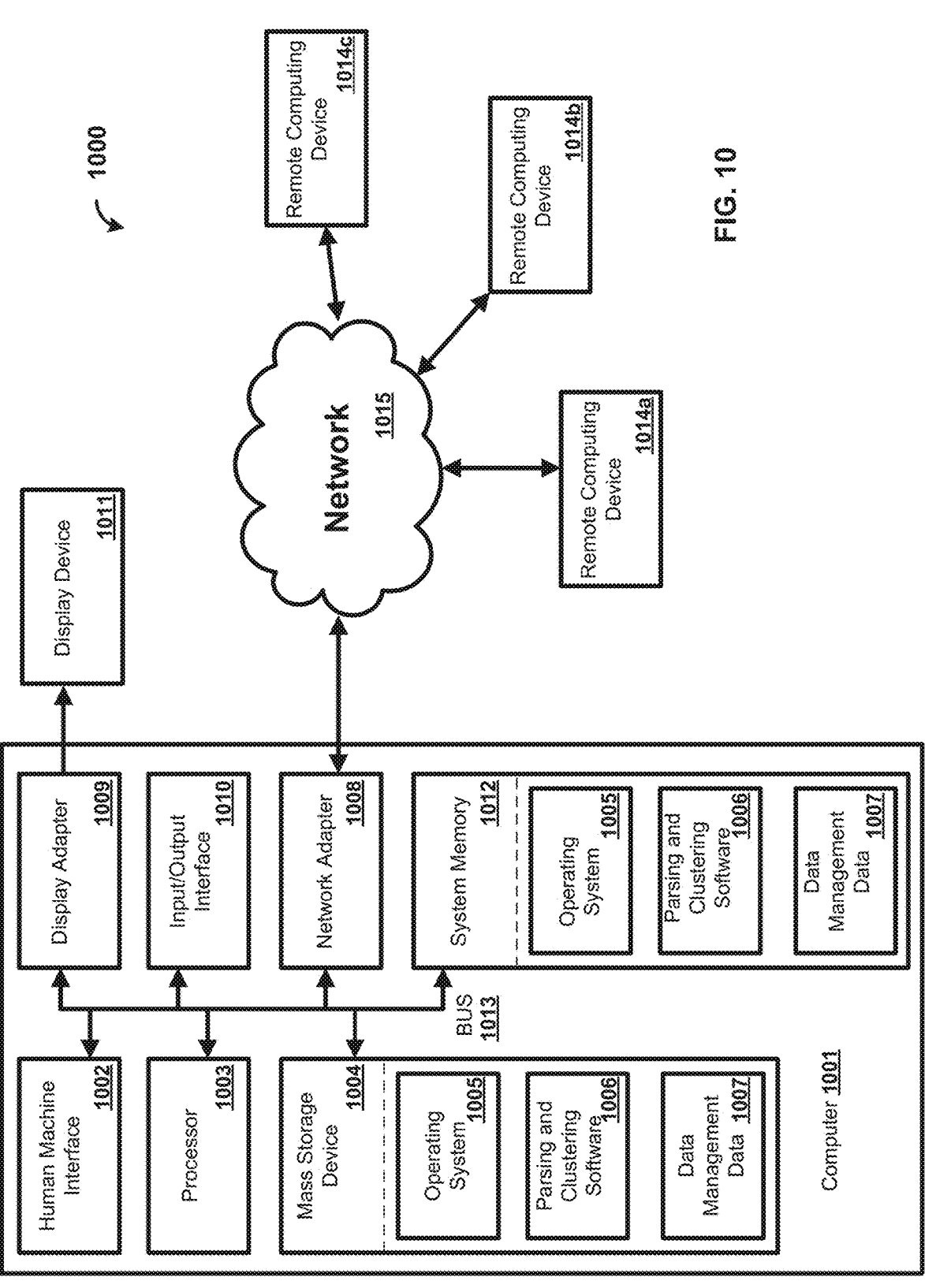
FIG. 10 is a block diagram of a computing device.

The methods and systems may be implemented on a computer 1001 as in FIG. 10 and described below. The voice enabled device 101 and the computing device 106 of FIG. 1 may be a computer as shown in FIG. 10. Similarly, the methods and systems described may utilize one or more computers to perform one or more functions in one or more locations. FIG. 10 is a block diagram of an example operating environment for performing the described methods. This operating environment is only an example of an operating environment and is not intended to suggest any limitation as to the scope of use or functionality of operating environment architecture. Neither should the operating environment be interpreted as having any dependency or requirement relating to any one or combination of components of the operating environment.

The described methods and systems may be operational with numerous other general purpose or special purpose computing system environments or configurations. Examples of well-known computing systems, environments, and/or configurations that may be suitable for use with the systems and methods include, but are not limited to, personal computers, server computers, laptop devices, and multiprocessor systems. Additional examples are set top boxes, programmable consumer electronics, network PCs, minicomputers, mainframe computers, distributed computing environments that include any of the above systems or devices, and the like.

The processing of the described methods and systems may be performed by software components. The described systems and methods may be described in the general context of computer-executable instructions, such as program modules, being executed by one or more computers or other devices. Generally, program modules may be computer code, routines, programs, objects, components, data structures, etc. that perform particular tasks or implement particular abstract data types. The described methods may also be practiced in grid-based and distributed computing environments where tasks are performed by remote processing devices that are linked through a communications network. In a distributed computing environment, program modules may be located in both local and remote computer storage media including memory storage devices.

One skilled in the art will appreciate that the systems and methods described herein may be implemented via a general-purpose computing device in the form of a computer 1001. The components of the computer 1001 may be, but are not limited to, one or more processors 1003, a system memory 1012, and a system bus 1013 that couples various system components including the one or more processors 1003 to the system memory 1012. The system may utilize parallel computing.

The system bus 1013 represents one or more of several possible types of bus structures, including a memory bus or memory controller, a peripheral bus, an accelerated graphics port, or local bus using any of a variety of bus architectures. Such architectures may include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description may also be implemented over a wired or wireless network connection and each of the subsystems, including the one or more processors 1003, a mass storage device 1004, an operating system 1005, parsing and clustering software 1006, syntactic data 1007, a network adapter 1008, the system memory 1012, an Input/Output Interface 1010, a display adapter 1009, a display device 1011, and a human machine interface 1002, may be contained within one or more remote computing devices 1014a,b,c at physically separate locations, connected through buses of this form, in effect implementing a fully distributed system.

The computer 1001 typically has a variety of computer readable media. Example readable media may be any available media that is accessible by the computer 1001 and can be both volatile and non-volatile media, removable and non-removable media. The system memory 1012 can be computer readable media in the form of volatile memory, such as random access memory (RAM), and/or non-volatile memory, such as read only memory (ROM). The system memory 1012 typically contains data such as the syntactic data 1007 and/or program modules such as the operating system 1005 and the parsing and clustering software 1006 that are immediately accessible to and/or are presently operated on by the one or more processors 1003.

The computer 1001 may also have other removable/non-removable, volatile/non-volatile computer storage media. FIG. 10 is an example of the mass storage device 1004 which may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1004, such as the operating system 1005 and the parsing and clustering software 1006. Each of the operating system 1005 and the parsing and clustering software 1006 (or some combination thereof) may have elements of the programming and the parsing and clustering software 1006. The syntactic data 1007 may also be stored on the mass storage device 1004. The syntactic data 1007 may be stored in any of one or more databases known in the art. Examples of such databases are DB2®, Microsoft® Access, Microsoft® SQL Server, Oracle®, MySQL, PostgreSQL, and the like. The databases may be centralized or distributed across multiple systems.

The user may enter commands and information into the computer 1001 via an input device (not shown). Examples of such input devices include, but are not limited to, a keyboard, pointing device (e.g., a "mouse"), a microphone, a joystick, a scanner, tactile input devices such as gloves, and other body coverings, and the like These and other input devices may be connected to the one or more processors 1003 via the human machine interface 1002 that is coupled to the system bus 1013, but may be connected by other interface and bus structures, such as a parallel port, game port, an IEEE 1394 Port (also known as a Firewire port), a serial port, or a universal serial bus (USB).

The display device 1011 may also be connected to the system bus 1013 via an interface, such as the display adapter 1009. It is contemplated that the computer 1001 may have more than one display adapter 1009 and the computer 1001 may have more than one display device 1011. The display device 1011 may be a monitor, an LCD (Liquid Crystal Display), or a projector. In addition to the display device 1011, other output peripheral devices may have components such as speakers (not shown) and a printer (not shown) which may be connected to the computer 1001 via the Input/Output Interface 1010. Any step and/or result of the methods may be output in any form to an output device. Such output may be any form of visual representation, including, but not limited to, textual, graphical, animation, audio, tactile, and the like. The display device 1011 and computer 1001 may be part of one device, or separate devices.

The computer 1001 may operate in a networked environment using logical connections to one or more remote computing devices 1014*a,b,c*. A remote computing device may be a personal computer, portable computer, smartphone, a server, a router, a network computer, a peer device or other common network node, and so on. Logical connections between the computer 1001 and a remote computing device 1014*a,b,c* may be made via a network 1015, such as a local area network (LAN) and/or a general wide area network (WAN). Such network connections may be through the network adapter 1008. The network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the one or more processors 1003 of the computer. An implementation of the parsing and clustering software 1006 may be stored on or sent across some form of computer readable media. Any of the described methods may be performed by computer readable instructions embodied on computer readable media. Computer readable media may be any available media that may be accessed by a computer. Computer readable media may be "computer storage media" and "communications media." "Computer storage media" may be volatile and non-volatile, removable and non-removable media implemented in any methods or technology for storage of information such as computer readable instructions, data structures, program modules, or other data. Example computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other configurations will be apparent to those skilled in the art from consideration of the specification and practice described herein. It is intended that the specification be considered exemplary only, with a true scope and spirit being indicated by the following claims.

What is claimed is:

1. A method comprising:

determining, based on a first vectorization of a first root word and a first plurality of dependent words of a received natural language voice input, a first intent associated with the received natural language voice input;

determining, by an artificial neural network, based on the first intent, a second intent associated with a stored voice input, wherein the stored voice input is associated with a content-based response;

causing output, by the artificial neural network, via an interactive content-based response user interface, and based on the first intent and the second intent, of a cluster comprising the received natural language voice input and the content-based response; and causing output, based on a user interaction configured to expand the cluster, of an expanded cluster.

2. The method of claim 1, wherein the content-based response comprises a deep learning response.

3. The method of claim 1, wherein determining the first intent comprises mapping at least a portion of the received natural language voice input to stored text.

4. The method of claim 1, further comprising determining, based on the stored voice input one or more of: a command or an action.

5. The method of claim 4, wherein determining the command or the action comprises mapping the stored voice input to stored text.

6. The method of claim 1, wherein the cluster comprises one or more selectable subclusters, and wherein the one or more selectable subclusters are associated with one or more additional content-based responses.

7. The method of claim 6, further comprising:

receiving, via the one or more selectable subclusters, one or more user inputs; and displaying, based on the one or more user inputs, one or more visualization interfaces associated with the one or more additional content-based responses.

8. The method of claim 1, wherein the stored voice input is associated with statistical information, wherein the statistical information is based on a quantity of voice inputs received by a voice enabled device.

9. The method of claim 1, further comprising:

comparing the first intent and the second intent;

determining, based on the comparison of the first intent and the second intent, a similarity between the first intent and the second intent; and causing output, based on the similarity, a visualization of the first intent and the second intent.

10. The method of claim 1, further comprising receiving a user input configured to expand the cluster.

11. A system comprising:

a computing device associated with an artificial neural network configured to:

determine, based on a first vectorization of a first root word and a first plurality of dependent words of a received natural language voice input, a first intent associated with the received natural language voice input;

determine, by an artificial neural network, based on the first intent, a second intent associated with a stored voice input, wherein the stored voice input is associated with a content-based response;

cause output, by the artificial neural network, via an interactive content-based response user interface, and based on the first intent and the second intent, of a cluster comprising the received natural language voice input and the content-based response; and cause output, based on a user interaction configured to expand the cluster, an expanded cluster; and a user device configured to:

send the natural language voice input.

12. The system of claim 11, wherein the content-based response comprises a deep learning response.

13. The system of claim 11, wherein the computing device is configured to determine the first intent by mapping at least a portion of the received natural language voice input to stored text.

14. The system of claim 11, wherein the computing device is further configured to determine, based on the stored voice input one or more of: a command or an action.

15. The system of claim 14, wherein the computing device is configured to determine the command or the action by mapping the stored voice input to stored text.

16. The system of claim 11, wherein the cluster comprises one or more selectable subclusters, and wherein the one or more selectable subclusters are associated with one or more additional content-based responses.

17. The system of claim 16, wherein the computing device is further configured to:

receive, via the one or more selectable subclusters, one or more user inputs; and display, based on the one or more user inputs, one or more visualization interfaces associated with the one or more additional content-based responses.

18. The system of claim 11, wherein the stored voice input is associated with statistical information, wherein the statistical information is based on a quantity of voice inputs received by a voice enabled device.

19. An apparatus comprising:

one or more processors; and memory storing processor-executable instructions that, when executed by the one or more processors, cause the one or more processors to:

determine, based on a first vectorization of a first root word and a first plurality of dependent words of a received natural language voice input, a first intent associated with the received natural language voice input;

determine, by an artificial neural network, based on the first intent, a second intent associated with a stored voice input, wherein the stored voice input is associated with a content-based response;

cause output, by the artificial neural network, via an interactive content-based response user interface, and based on the first intent and the second intent, of a cluster comprising the received natural language voice input and the content-based response; and cause output, based on a user interaction configured to expand the cluster, an expanded interactive cluster.

20. The apparatus of claim 19, wherein the content-based response comprises a deep learning response.

21. The apparatus of claim 19, wherein the processor-executable instructions that, when executed by the one or more processors, cause the one or more processors to determine the first intent further cause the one or more processors to map at least a portion of the received natural language voice input to stored text.

22. The apparatus of claim 19, wherein the processor-executable instructions, when executed by the one or more processors, further cause the one or more processors to determine, based on the stored voice input one or more of: a command or an action.

23. The apparatus of claim 22, wherein the processor-executable instructions that, when executed by the one or more processors, cause the one or more processors to determine the command or the action further cause the one or more processors to map the stored voice input to stored text.

24. The apparatus of claim 19, wherein the cluster comprises one or more selectable subclusters, and wherein the one or more selectable subclusters are associated with one or more additional content-based responses.

25. The apparatus of claim 24, wherein the processor-executable instructions, when executed by the one or more processors, further cause the one or more processors to:

receive, via the one or more selectable subclusters, one or more user inputs; and display, based on the one or more user inputs, one or more visualization interfaces associated with the one or more additional content-based responses.

26. The apparatus of claim 19, wherein the stored voice input is associated with statistical information, wherein the statistical information is based on a quantity of voice inputs received by a voice enabled device.

27. One or more non-transitory computer-readable media storing processor-executable instructions thereon, that, when executed by at least one processor, cause the at least one processor to:

determine, based on a first vectorization of a first root word and a first plurality of dependent words of a received natural language voice input, a first intent associated with the received natural language voice input;

determine, by an artificial neural network, based on the first intent, a second intent associated with a stored voice input, wherein the stored voice input is associated with a content-based response;

cause output, by the artificial neural network, via an interactive content-based response user interface, and based on the first intent and the second intent, of a cluster comprising the received natural language voice input and the content-based response; and cause output, based on a user interaction configured to expand the cluster, an expanded cluster.

28. The one or more non-transitory computer-readable media of claim 27, wherein the content-based response comprises a deep learning response.

29. The one or more non-transitory computer-readable media of claim 27, wherein the processor-executable instructions that, when executed by the at least one processor, cause the at least one processor to determine the first intent further cause the at least one processor to map at least a portion of the received natural language voice input to stored text.

30. The one or more non-transitory computer-readable media of claim 27, wherein the processor-executable instructions, when executed by the at least one processor, further cause the at least one processor to determine, based on the stored voice input one or more of: a command or an action.

31. The one or more non-transitory computer-readable media of claim 30, wherein the processor-executable instructions that, when executed by the at least one processor, cause the at least one processor to determine the command or the action further cause the at least one processor to map the stored voice input to stored text.

32. The one or more non-transitory computer-readable media of claim 27, wherein the cluster comprises one or more selectable subclusters, and wherein the one or more selectable subclusters are associated with one or more additional content-based responses.

33. The one or more non-transitory computer-readable media of claim 32, wherein the processor-executable instructions, when executed by the at least one processor, further cause the at least one processor to:

receive, via the one or more selectable subclusters, one or more user inputs; and display, based on the one or more user inputs, one or more visualization interfaces associated with the one or more additional content-based responses.

34. The one or more non-transitory computer-readable media of claim 27, wherein the stored voice input is associated with statistical information, wherein the statistical information is based on a quantity of voice inputs received by a voice enabled device.

* * * * *